(12) United States Patent
Sureshkumar et al.

(10) Patent No.: US 11,113,322 B2
(45) Date of Patent: Sep. 7, 2021

(54) DYNAMICALLY GENERATING STRATEGIC PLANNING DATASETS BASED ON COLLECTING, AGGREGATING, AND FILTERING DISTRIBUTED DATA COLLECTIONS

(71) Applicant: Bank of America Corporation, Charlotte, NC (US)

(72) Inventors: Moses Sureshkumar, Weddington, NC (US); Rana Banu Teja Balimi, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/736,112

(22) Filed: Jan. 7, 2020

(65) Prior Publication Data
US 2021/0209138 A1 Jul. 8, 2021

(51) Int. Cl.
| | |
|---|---|
| *G06F 3/0482* | (2013.01) |
| *G06F 16/332* | (2019.01) |
| *G06F 16/38* | (2019.01) |
| *G06F 9/54* | (2006.01) |
| *G06F 16/34* | (2019.01) |
| *G06F 16/335* | (2019.01) |

(52) U.S. Cl.
CPC .......... *G06F 16/332* (2019.01); *G06F 3/0482* (2013.01); *G06F 9/542* (2013.01); *G06F 16/335* (2019.01); *G06F 16/34* (2019.01); *G06F 16/38* (2019.01)

(58) Field of Classification Search
CPC ................................................. G06F 3/0482
See application file for complete search history.

(56) References Cited

U.S. PATENT DOCUMENTS

| | | | |
|---|---|---|---|
| 5,737,494 A * | 4/1998 | Guinta | G06Q 10/06 706/47 |
| 6,556,974 B1 * | 4/2003 | D'Alessandro | G06Q 10/0639 705/7.32 |
| 7,054,827 B1 * | 5/2006 | Lautzenheiser | G06Q 30/02 705/7.32 |
| 7,421,442 B2 | 9/2008 | Gelb et al. | |
| 7,428,704 B2 | 9/2008 | Baker et al. | |

(Continued)

*Primary Examiner* — Daniel Rodriguez
(74) *Attorney, Agent, or Firm* — Banner & Witcoff, Ltd.; Michael A. Springs

(57) ABSTRACT

Aspects of the disclosure relate to dynamically generate strategic planning datasets based on distributed data collections. A computing platform may direct an administrator device to display an interface configured to receive user input specifying text input fields and a corresponding graphical layout. The computing platform may receive a data object specifying the text input fields and the graphical layout, which may be stored using first key value pairs. Based on the first key value pairs, the computing platform may generate a data entry interface that includes the text input fields and is formatted based on the graphical layout. The computing platform may send the data entry interface and may receive data entry information corresponding to responses in the text input fields. The computing platform may store the data entry information using second key value pairs, and may use the second key value pairs to generate an aggregate data collection interface.

20 Claims, 14 Drawing Sheets

(56) References Cited

U.S. PATENT DOCUMENTS

| | | | |
|---|---|---|---|
| 7,552,063 B1* | 6/2009 | McEachern | G06Q 30/02 |
| | | | 705/3 |
| 8,561,159 B2 | 10/2013 | Gelb et al. | |
| 8,638,363 B2 | 1/2014 | King et al. | |
| 8,713,418 B2 | 4/2014 | King et al. | |
| 8,762,414 B2 | 6/2014 | Vau et al. | |
| 8,910,225 B2 | 12/2014 | Scherlis et al. | |
| 8,990,235 B2 | 3/2015 | King et al. | |
| 9,071,677 B2 | 6/2015 | Aggarwal et al. | |
| 9,075,779 B2 | 7/2015 | King et al. | |
| 9,084,022 B2 | 7/2015 | Choi et al. | |
| 9,275,051 B2 | 3/2016 | King et al. | |
| 9,503,570 B2 | 11/2016 | Aggarwal et al. | |
| 9,639,960 B1 | 5/2017 | Loveland et al. | |
| 9,741,258 B1 | 8/2017 | Chetlur et al. | |
| 9,787,738 B2 | 10/2017 | Hix et al. | |
| 9,864,597 B1 | 1/2018 | Marmaros et al. | |
| 10,043,062 B2 | 8/2018 | Chetlur et al. | |
| 10,089,896 B2 | 10/2018 | Chetlur et al. | |
| 10,146,514 B1* | 12/2018 | Joyce | G06F 3/0481 |
| 10,466,971 B2 | 11/2019 | Balasubramanian et al. | |
| 10,740,536 B2* | 8/2020 | Kasa | G06F 40/166 |
| 2002/0016797 A1* | 2/2002 | Taysi | G06Q 10/107 |
| | | | 715/255 |
| 2005/0015362 A1* | 1/2005 | Ostertag | G06Q 10/06311 |
| 2007/0042335 A1* | 2/2007 | Tidwell-Scheuring | G09B 7/00 |
| | | | 434/350 |
| 2007/0204216 A1* | 8/2007 | Morgan | G06F 40/106 |
| | | | 715/210 |
| 2007/0260970 A1* | 11/2007 | Dorwart | G06F 40/18 |
| 2008/0033792 A1* | 2/2008 | Rosner | G06Q 10/063112 |
| | | | 705/7.14 |
| 2009/0327051 A1* | 12/2009 | Nerby | G06Q 30/0203 |
| | | | 705/7.32 |
| 2010/0274636 A1* | 10/2010 | Sheridan | G06Q 30/0203 |
| | | | 705/7.32 |
| 2011/0258532 A1* | 10/2011 | Ceze | G06F 16/9574 |
| | | | 715/234 |
| 2012/0072232 A1* | 3/2012 | Frankham | G16H 10/20 |
| | | | 705/2 |
| 2012/0117540 A1* | 5/2012 | Hagerty | G06F 16/2428 |
| | | | 717/120 |
| 2014/0236682 A1* | 8/2014 | Green | G06Q 10/06398 |
| | | | 705/7.42 |
| 2014/0289386 A1* | 9/2014 | Vatto | G06Q 10/06315 |
| | | | 709/223 |
| 2015/0207628 A1* | 7/2015 | Hilla | G06F 11/073 |
| | | | 714/758 |
| 2015/0339684 A1* | 11/2015 | Mani | G09B 7/00 |
| | | | 705/7.32 |
| 2017/0068967 A1* | 3/2017 | Montoya | G06Q 30/0203 |
| 2017/0193412 A1* | 7/2017 | Easton | G06Q 10/06313 |
| 2017/0323316 A1* | 11/2017 | Wheeler | G06Q 30/0203 |
| 2018/0040002 A1* | 2/2018 | Tierney | G06Q 30/0201 |
| 2018/0122256 A1* | 5/2018 | Smith | G09B 7/00 |
| 2018/0129989 A1* | 5/2018 | Bowers | G06Q 10/0635 |
| 2018/0322107 A1* | 11/2018 | Byun | G06F 40/174 |
| 2019/0066011 A1* | 2/2019 | Portnoy | G06Q 10/067 |
| 2020/0358783 A1* | 11/2020 | Beaver, III | G06Q 10/101 |
| 2020/0394680 A1* | 12/2020 | Froman | G06Q 10/10 |

* cited by examiner

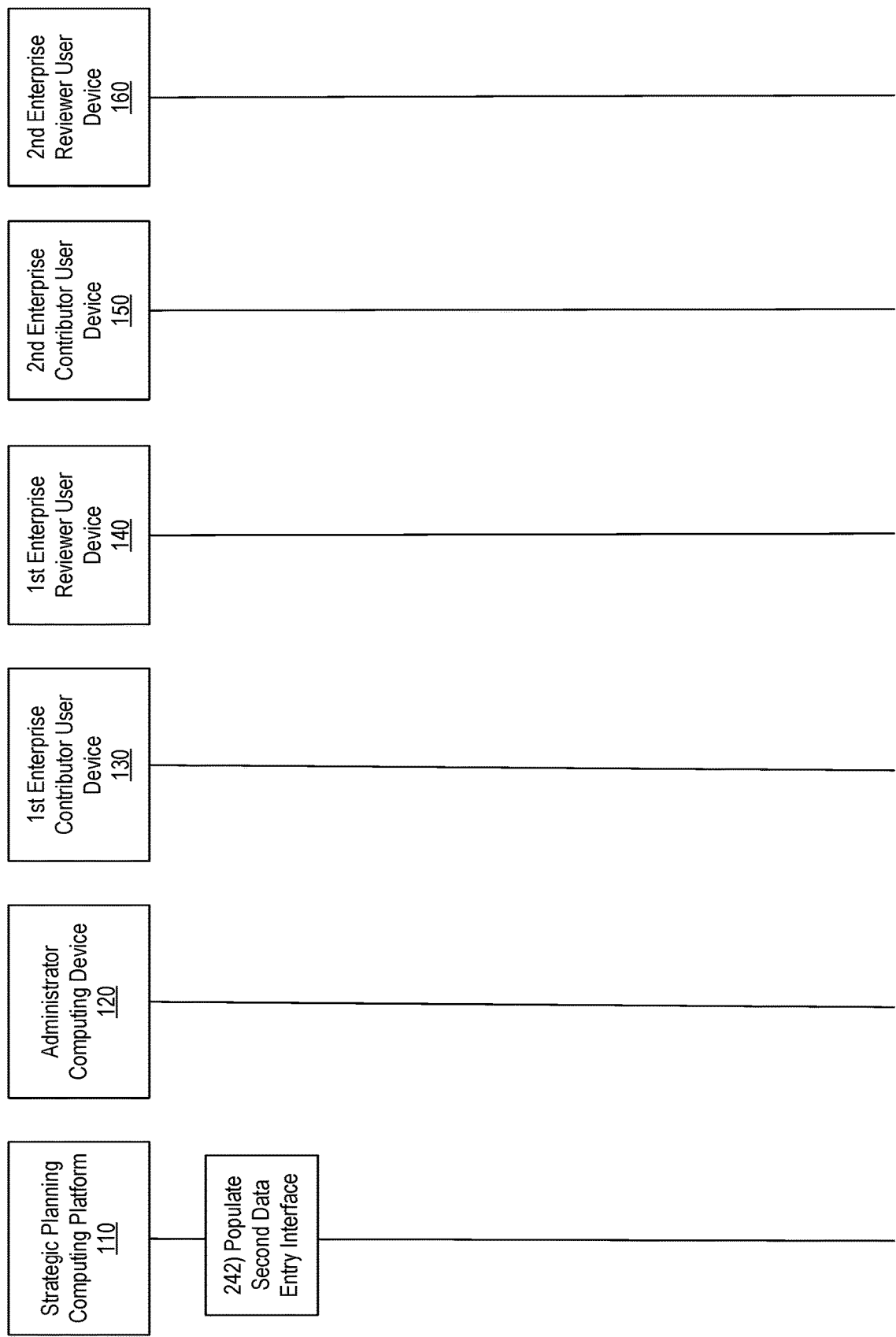

305

Contributor Interface

Please input your top three biggest local competitors:

Reviewer Interface

Awaiting input from:

Contributor 1 (25% complete)  [Send Reminder Notification]

Contributor 2 (75% complete)  [Send Reminder Notification]

Aggregate Data Interface

Top Nationwide Competitors:

1) Competitor #1

2) Competitor #2

3) Competitor #3

FIG. 5

DYNAMICALLY GENERATING STRATEGIC PLANNING DATASETS BASED ON COLLECTING, AGGREGATING, AND FILTERING DISTRIBUTED DATA COLLECTIONS

BACKGROUND

Aspects of the disclosure relate to electrical computers and digital data processing systems. In particular, one or more aspects of the disclosure relate to computing platforms that dynamically generate strategic planning datasets based on collecting, aggregating, and filtering distributed data collections.

In some cases, employees of an enterprise organization may be distributed across a plurality of local and/or regional markets. In these instances, to collect and generate information for use in various enterprise processes, such as strategic planning processes that may be conducted at enterprise-wide levels, administrators and associated computing processes may request and receive information from enterprise employees representative of their respective markets. The administrators then may manually compile an aggregated representation, based on the information received, of the information associated with the enterprise organization. In some instances, this may be a manually intensive and time consuming process that may result in a high error rate due to human error. Such data collection and aggregation may be further complicated when modification of fields or other aspects of a data entry interface are requested, and technical expertise is needed to make the requested changes. Thus, it may be difficult to efficiently and effectively collect and aggregate cross market information associated with an enterprise organization.

SUMMARY

Aspects of the disclosure provide effective, efficient, scalable, and convenient technical solutions that address and overcome the technical problems associated with dynamically assembling and displaying strategic planning datasets based on collecting, aggregating, and filtering distributed data collections. For example, some aspects of the disclosure provide techniques that may enable computing devices to store data objects and data field input information using key value pairs, and to subsequently use these key value pairs for automatic generation of aggregate data collection interfaces that may be used in strategic planning. In doing so, time spent manually aggregating data field input information from across a plurality of markets to generate a dataset representative of the markets as a whole may be decreased. Furthermore, by automating this process and minimizing manual effort, error rates of the aggregate data collections (e.g., due to human error) may be reduced. Furthermore, the systems and methods described herein relate to facilitating generation and modification of data entry interfaces by an administrator without the need for additional technical support or backend programming. Accordingly, this disclosure may provide technical advantages by reducing time and effort expended in manual data aggregation/interface modification (and accordingly, the associated cost of such manual aggregation/technical support) and further by reducing error rates associated with the aggregated data (e.g., by minimizing opportunity for human error).

In accordance with one or more embodiments of the disclosure, a computing platform comprising at least one processor, a communication interface, and memory storing computer-readable instructions may send, to an administrator computing device, one or more commands directing the administrator computing device to display a graphical user interface configured to receive user input specifying: one or more text input fields, and a graphical layout of the one or more text input fields. Next, the computing platform may receive, from the administrator computing device, a data object indicating the one or more text input fields and the graphical layout of the one or more text input fields. Using a first plurality of key value pairs, the computing platform may store template layout information corresponding to the one or more text input fields and the graphical layout of the one or more text input fields. Subsequently, the computing platform may identify a plurality of user accounts configured to receive an input request for the one or more text input fields. Based on the template layout information, the computing platform may generate a data entry interface, which may include the one or more text input fields and may be formatted based on the graphical layout of the one or more text input fields. The computing platform may then send, to a plurality of enterprise user devices linked to the plurality of user accounts, the data entry interface and a notification requesting user input at the one or more text input fields, which may cause each of the plurality of enterprise user devices to cause display of the data entry interface. In addition, the computing platform may receive, from each of the plurality of enterprise user devices, data entry information corresponding to responses in the one or more text input fields and may store the data entry information using a second plurality of key value pairs. In response to receiving a request for output of an aggregate data collection based on the data entry information from one of the plurality of enterprise user devices, the computing platform may generate, using the second plurality of key value pairs and based on the data entry information, aggregate data collection information. Lastly, the computing platform may send, to the one of the plurality of enterprise user devices, the aggregate data collection information, which may cause the one of the plurality of enterprise user devices to cause display of an aggregate data collection interface.

In one or more instances, the computing platform may perform cross validation of the data entry information by comparing first data entry information to other received data entry information. In these instances, the first data entry information may be received from a first enterprise user device, of the plurality of enterprise user devices, located in a first geographic location, and the other data entry information may be received from a subset of the plurality of enterprise user devices that does not include the first enterprise user device, each located in a geographic location other than the first geographic location.

In one or more instances, the computing platform may automatically perform the cross validation upon receipt of the data entry information. In one or more instances, the computing platform may automatically perform the cross validation upon receipt of the request for the output of the aggregate data collection.

In one or more instances, the first plurality of key value pairs may be a plurality of correlations, each representing a relationship between one of the one or more text input fields and a location of the one of the one or more text input fields on the graphical layout of the one or more text input fields. In one or more instances, the second plurality of key value pairs may be a plurality of correlations, each representing a relationship between one of the one or more text input fields and a subset of the data entry information corresponding to the one of the one or more text input fields.

In one or more instances, the computing platform may receive the data entry information by receiving a first subset of the data entry information from a plurality of market contributors and receiving a second subset of the data entry information from a plurality of market reviewers, where the second subset of the data entry information includes a notification validating the first subset of the data entry information. In one or more instances, based on the request to output the aggregate data collection, the computing platform may identify a first user of the one of the plurality of enterprise user devices as a market contributor. In these instances, the computing platform may send, along with the aggregate data collection information, one or more commands directing the one of the plurality of enterprise user devices to cause display of the aggregate data collection interface, where the one or more commands indicate that a first version of the aggregate data collection interface, specific to market contributors, should be displayed.

In one or more instances, in response to receiving another request for output of the aggregate data collection based on the data entry information from another one of the plurality of enterprise user devices, the computing platform may generate, using the second plurality of key value pairs and based on the data entry information, the aggregate data collection information. Based on the other request for output of the aggregate data collection, the computing platform may identify a second user of the other one of the plurality of enterprise user devices as a market reviewer. Then, the computing platform may send, along with the aggregate data collection information, one or more commands directing the other one of the plurality of enterprise user devices to cause display of the aggregate data collection interface, where the one or more commands indicate that a second version of the aggregate data collection interface, specific to market reviewers and different from the first version of the aggregate data collection interface, should be displayed.

In one or more instances, the computing platform may identify that a predetermined period of time has expired. In response to identifying the expiration of the predetermined period of time, the computing platform may send, to the plurality of enterprise user devices linked to the plurality of user accounts, the data entry interface and a notification requesting updated user input at the one or more text input fields, which may cause each of the plurality of enterprise user devices to cause display of the data entry interface. In these instances, the data entry interface may include at least a portion of the data entry information received from the plurality of enterprise user devices prior to the expiration of the predetermined period of time.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2I depict an illustrative event sequence for dynamically assembling and displaying strategic planning datasets based on collecting, aggregating, and filtering distributed data collections in accordance with one or more example embodiments;

FIGS. 3-5 depict illustrative user interfaces for dynamically assembling and displaying strategic planning datasets based on collecting, aggregating, and filtering distributed data collections in accordance with one or more example embodiments.

DETAILED DESCRIPTION

Figure 1A:
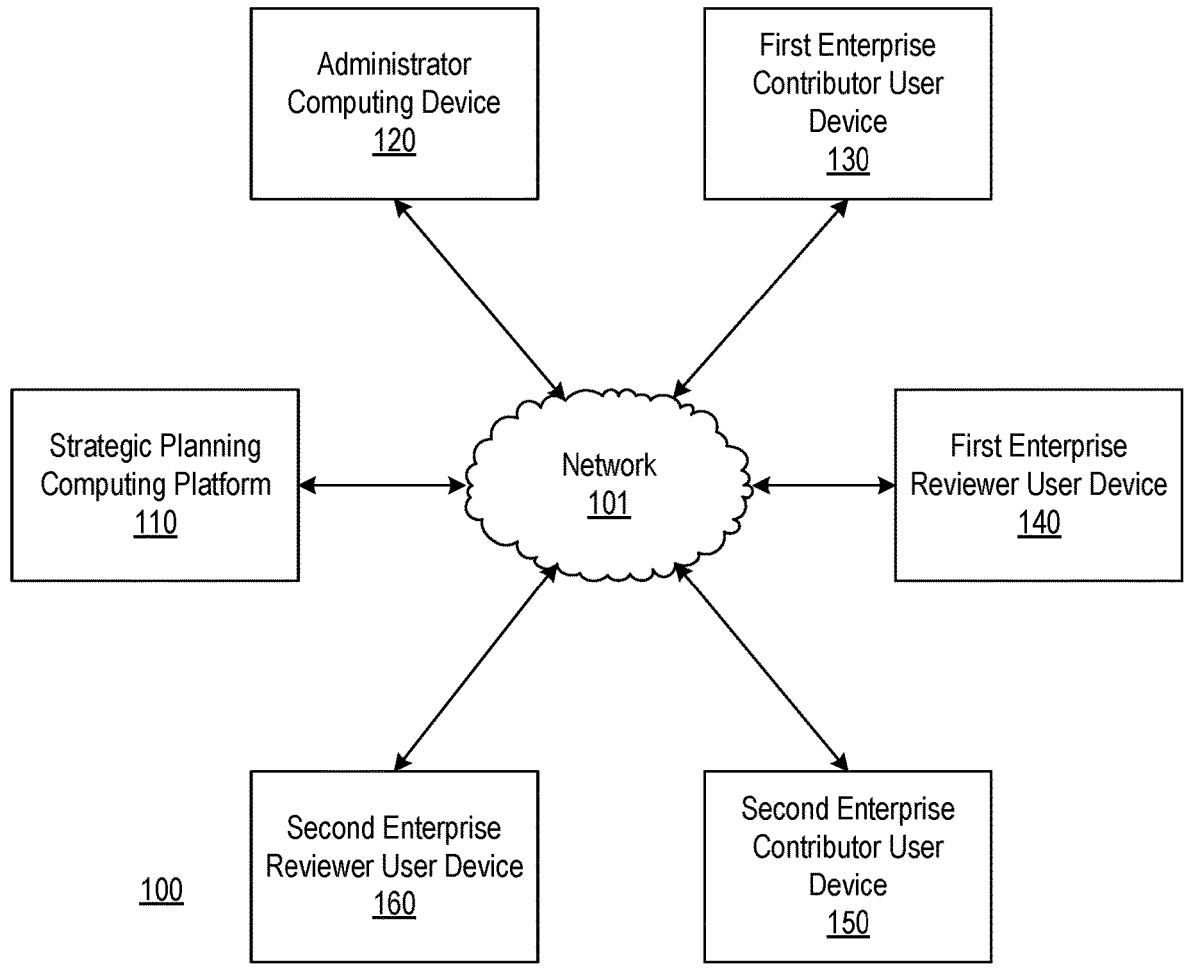
FIGS. 1A-1B depict an illustrative computing environment for dynamically assembling and displaying strategic planning datasets based on collecting, aggregating, and filtering distributed data collections in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure provide systems and methods to efficiently and automatically generate aggregated data collections based on input received from one or more sources (e.g., user devices associated with market employees). The disclosure describes, among other things, a computing platform that may receive and compile data from a plurality of user devices, and subsequently format the compiled data for presentation at the plurality of user devices.

For example, local market delivery organizations may consist of market presidents, market managers, market contributors, other line of business leaders, or the like. In some instances, such organizations may use a slideshow or other data aggregation based tool to capture and output various items such as actionable goals for the upcoming year, cross line of business activities, clients and prospects, economic mobility data, information regarding marketing and communications, or the like. By implementing one or more aspects of the disclosure, an organization may avoid a manually labor intensive operation, where business administrators might send out data templates (e.g., slideshow templates, or the like) for individuals to fill out the templates and send the templates back to the business administrators, and the administrators might the collate all the information together to provide executive level summary reports.

Furthermore, in such a manual process, templates might undergo various revisions due to changes throughout the year, and these revisions might cause several back and forth communications between administrators and market employees (e.g., sending updated templates, receiving updated data, or the like). Such additional communications might result in a high error rate for the received data and/or significant productivity losses due to manual copying and/or pasting of data. Furthermore, such a manually intensive process might lead to a risk of human error in transposing the data.

This disclosure describes a solution that addresses one or more of these and/or other issues while providing intuitive and easy to use user interfaces (e.g., that users may utilize for data entry, template design, or the like). The systems and methods described herein provide an administrative functionality where an administrator may create a custom user interface from a blank slate using controls provided in a virtual tool box. The administrator may draw brand new interfaces on the fly on a blank palette without having to engage a technical engineer to build the interfaces. Once an interface is designed, it may be displayed for preview and subsequently published for usage across different markets. Once published, for instance, the screens may be made available to market employees for data entry. The administrators may edit the screens at any time and may re-publish the updates back to the market employees. Once all the interfaces are designed and published, the market specific employees (e.g., contributors and reviewers) may initiate a strategic work plan process for the year by initiating data entry. Once data entry is complete, administrators may link data elements on the user interface to elements in an aggregate data collection output (e.g., a slideshow presentation, or the like), so that market employees may automatically generate executive level reports.

This solution may be fully self-service, and might not need a line of business to engage a technical development engineer to create new screens or modify existing ones. Administrators may create and/or edit screens on the fly and publish them to market employees. In doing so, the administrator may save a tremendous amount of time and cost to the line of business as engaging technical resources to perform changes to the application may be time consuming and expensive. In addition, administrators may be able to draw a screen on an empty palette based on a desired look and feel for the interface. A user interface may provide a list of controls that are available for the administrator's use, such as controls allowing the administrators to pick up an item and drag/drop it on the interface to achieve a desired design. Furthermore, the administrators may preview the interface to allow them to see how the final user version will appear. As yet an additional technical benefit, because a dynamic and extensible database is used to store data, business administrators may add any number of interfaces for display, and there is no limit to controls that may be added to any interface.

Thus, one or more of the methods and/or systems described herein may assist administrators with the collection and presentation of aggregated data, and may result in reduced cost, reduced time, increased administrator flexibility (e.g., in template generation) and increased accuracy by reducing an amount of manual effort by both technical experts and administrators in achieving such presentation.

Figure 1B:
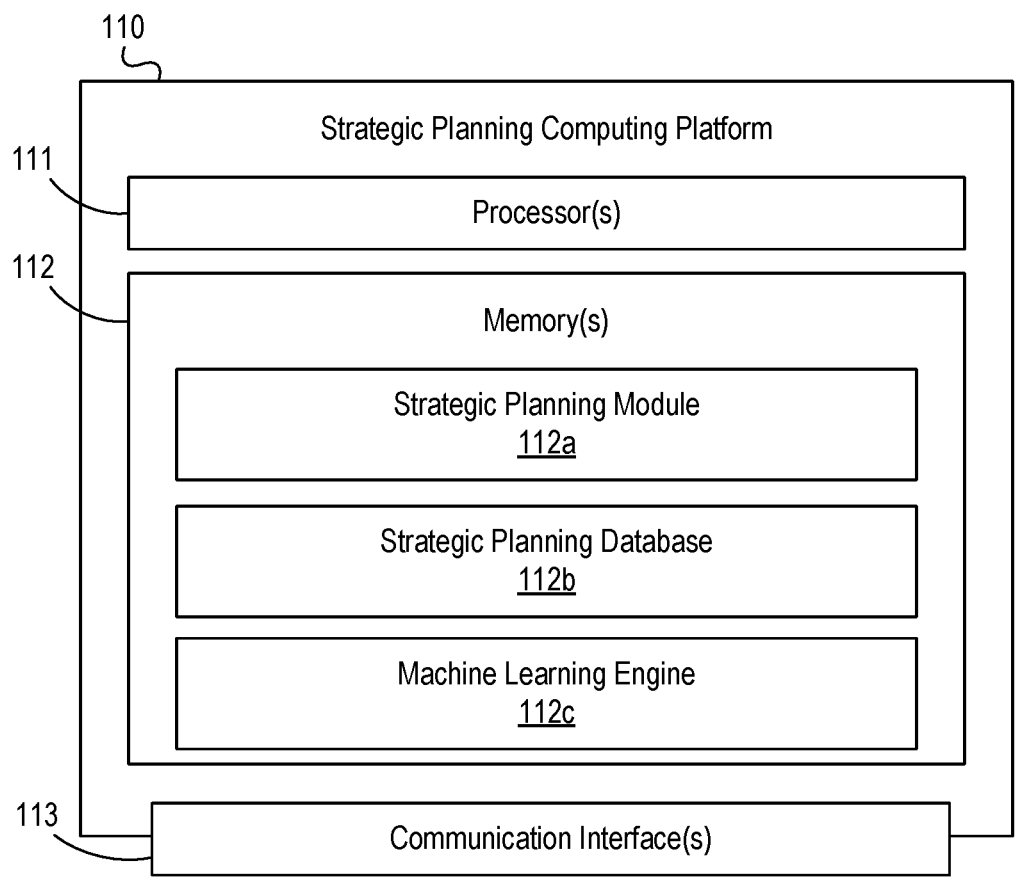

FIGS. 1A-1B depict an illustrative computing environment for dynamically assembling and displaying strategic planning datasets based on collecting, aggregating, and filtering distributed data collections in accordance with one or more example embodiments. Referring to FIG. 1A, computing environment 100 may include one or more computer systems. For example, computing environment 100 may include a strategic planning computing platform 110, an administrator computing device 120, a first enterprise contributor user device 130, a first enterprise reviewer user device 140, a second enterprise contributor user device 150, and a second enterprise reviewer user device 160.

As described further below, strategic planning computing platform 110 may be a computer system that includes one or more computing devices (e.g., servers, server blades, or the like) and/or other computer components (e.g., processors, memories, communication interfaces) that may be used to facilitate template generation, data assembly and storage, and output of an aggregated data collection. In some instances, the strategic planning computing platform 110 may be maintained by an enterprise organization such as a financial institution, and may be configured to receive requests from one or more enterprise user devices, which may each be linked to and/or otherwise associated with employees of the financial institution (e.g., market contributors, market reviewers, administrators, or the like).

Administrator computing device 120 may be a desktop computer, laptop computer, tablet, mobile device, or the like, and may be used by an individual such as a market administrator for a financial institution. In addition, administrator computing device 120 may be configured to cause display of and/or otherwise present one or more graphical user interfaces (e.g., interfaces to design a template for aggregate data presentation, or the like). In one or more instances, the administrator computing device 120 may be configured to receive user input associated with template design (e.g., placement of text input fields, data objects, or the like).

First enterprise contributor user device 130 may be a desktop computer, laptop computer, tablet, mobile device, or the like, and may be used by an individual such as a market contributor (e.g., an employee who may contribute relevant data, but might not be tasked with reviewing the work of other individuals, such as an entry level employee) for a financial institution. In addition, first enterprise contributor user device 130 may be configured to cause display of and/or otherwise present one or more graphical user interfaces (e.g., interfaces that display various data input fields, aggregate data collections, or the like).

First enterprise reviewer user device 140 may be a desktop computer, laptop computer, tablet, mobile device, or the like, and may be used by an individual such as a market reviewer (e.g., an employee who may contribute relevant data, and may also review the work of other individuals to ensure accuracy, such as employee manager, market president, or the like) for a financial institution. In addition, first enterprise reviewer user device 140 may be configured to cause display of and/or otherwise present one or more graphical user interfaces (e.g., interfaces that display various data input fields, aggregate data collections, or the like). In some instances, the first enterprise reviewer user device 140 may be configured to cause display of and/or otherwise present one or more graphical user interfaces that illustrate progress by one or more market contributors in providing requested data.

Second enterprise contributor user device 150 may be a desktop computer, laptop computer, tablet, mobile device, or the like, and may be used by an individual such as a market contributor (e.g., an employee who may contribute relevant data, but might not be tasked with reviewing the work of other individuals, such as an entry level employee) for a financial institution. In addition, second enterprise contributor user device 150 may be configured to cause display of and/or otherwise present one or more graphical user interfaces (e.g., interfaces that display various data input fields, aggregate data collections, or the like).

Second enterprise reviewer user device 160 may be a desktop computer, laptop computer, tablet, mobile device, or the like, and may be used by an individual such as a market reviewer (e.g., an employee who may contribute relevant data, and may also review the work of other individuals to ensure accuracy, such as employee manager, market president, or the like) for a financial institution. In addition, second enterprise reviewer user device 160 may be configured to cause display of and/or otherwise present one or more graphical user interfaces (e.g., interfaces that display various data input fields, aggregate data collections, or the like). In some instances, the second enterprise reviewer user device 160 may be configured to cause display of and/or otherwise present one or more graphical user interfaces that illustrate progress by one or more market contributors in providing requested data.

Computing environment 100 also may include one or more networks, which may interconnect strategic planning computing platform 110, administrator computing device 120, first enterprise contributor user device 130, first enterprise reviewer user device 140, second enterprise contributor user device 150, and second enterprise reviewer user device 160. For example, computing environment 100 may include a network 101 (which may interconnect, e.g., strategic planning computing platform 110, administrator computing device 120, first enterprise contributor user device 130, first enterprise reviewer user device 140, second enterprise contributor user device 150, and second enterprise reviewer user device 160).

In one or more arrangements, strategic planning computing platform 110, administrator computing device 120, first enterprise contributor user device 130, first enterprise reviewer user device 140, second enterprise contributor user device 150, and second enterprise reviewer user device 160 may be any type of computing device capable of sending and/or receiving requests and processing the requests accordingly. For example, strategic planning computing platform 110, administrator computing device 120, first enterprise contributor user device 130, first enterprise reviewer user device 140, second enterprise contributor user device 150, second enterprise reviewer user device 160, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of strategic planning computing platform 110, administrator computing device 120, first enterprise contributor user device 130, first enterprise reviewer user device 140, second enterprise contributor user device 150, and second enterprise reviewer user device 160 may, in some instances, be special-purpose computing devices configured to perform specific functions.

Referring to FIG. 1B, strategic planning computing platform 110 may include one or more processors 111, memory 112, and communication interface 113. A data bus may interconnect processor 111, memory 112, and communication interface 113. Communication interface 113 may be a network interface configured to support communication between strategic planning computing platform 110 and one or more networks (e.g., network 101, or the like). Memory 112 may include one or more program modules having instructions that when executed by processor 111 cause strategic planning computing platform 110 to perform one or more functions described herein and/or one or more databases that may store and/or otherwise maintain information which may be used by such program modules and/or processor 111. In some instances, the one or more program modules and/or databases may be stored by and/or maintained in different memory units of strategic planning computing platform 110 and/or by different computing devices that may form and/or otherwise make up strategic planning computing platform 110. For example, memory 112 may have, host, store, and/or include strategic planning module 112a, strategic planning database 112b, and a machine learning engine 112c.

Strategic planning module 112a may have instructions that direct and/or cause strategic planning computing platform 110 to execute advanced techniques for collecting, aggregating, and presenting data, as discussed in greater detail below. Strategic planning database 112b may store information used by strategic planning module 112a and/or strategic planning computing platform 110 in generating one or more data entry interfaces, aggregate data collection interfaces, and/or in performing other functions. Machine learning engine 112c may have instructions that direct and/or cause the strategic planning computing platform 110 to facilitate strategic planning and to set, define, and/or iteratively refine optimization rules and/or other parameters used by the strategic planning computing platform and/or other systems in computing environment 100.

Figure 2A:
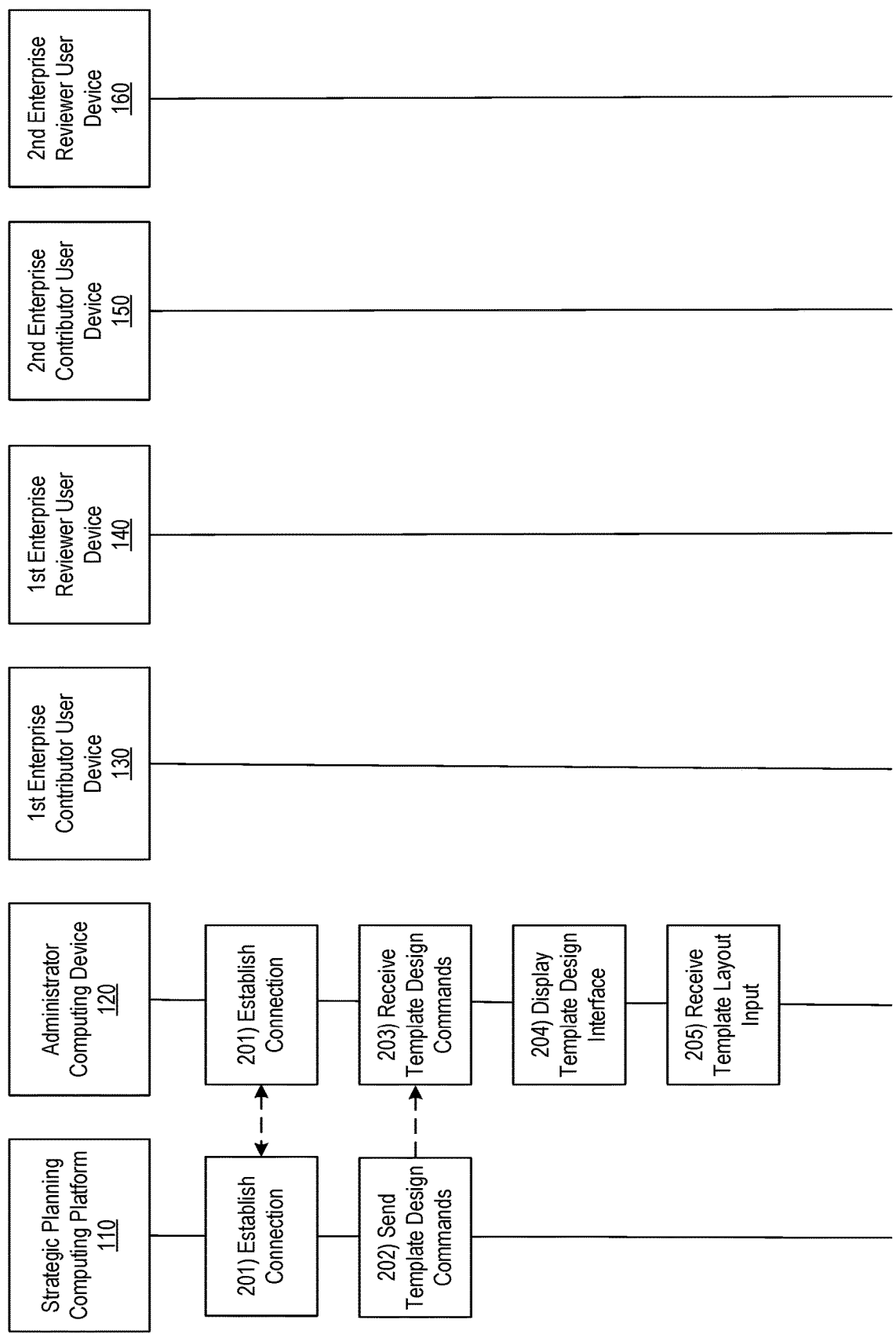

FIGS. 2A-2I depict an illustrative event sequence for dynamically assembling and displaying strategic planning datasets based on collecting, aggregating, and filtering distributed data collections in accordance with one or more example embodiments. Referring to FIG. 2A, at step 201, the strategic planning computing platform 110 may establish a connection with administrator computing device 120. In one or more instances, the strategic planning computing platform 110 may establish a first wireless data connection with the administrator computing device 120 to link the strategic planning computing platform 110 to the administrator computing device 120. In one or more instances, the strategic planning computing platform 110 may identify whether a connection is already established with the administrator computing device 120. If the strategic planning computing platform 110 already has an established connection with the administrator computing device 120, it might not re-establish the first wireless data connection. However, if the strategic computing platform 110 does not have an established connection with the administrator computing device 120, it may establish the first wireless data connection as described herein.

At step 202, the strategic planning computing platform 110 may send, share, or otherwise provide one or more commands directing the administrator computing device 120 to display a template design interface. In one or more instances, the strategic planning computing platform 110 may also send, along with the one or more commands directing the administrator computing device 120 to display the template design interface, template design information that may be used by the administrator computing device 120 to generate the template design interface. In one or more instances, the administrator computing device 120 may send the one or more template design commands via the communication interface 113 and while the first wireless data connection is established.

At step 203, the administrator computing device 120 may receive or otherwise access the one or more template design commands sent at step 202. In one or more instances, the administrator computing device 120 may receive the one or more template design commands from the strategic planning computing platform 110 while the first wireless data connection is established.

At step 204, the administrator computing device 120 may generate and display a template design interface in response to the one or more template design commands received at step 203. In one or more instances, in displaying the template design interface, the administrator computing device 120 may display a template design tool that may be configured to receive instructions to insert, remove, move, and/or perform other similar actions with regard to one or more data objects that may be arranged to create a user interface. For example, the administrator computing device 120 may generate and display an interface that allows an administrative user to define one or more text input fields, a graphical layout of the one or more text input fields, or the like. In these instances, the administrator computing device 120 may display a toolbar that may allow a user to select a particular action and may display a blank design area (e.g., a blank canvas, or the like) within which a user (e.g., an administrator) may design a template layout. Further, the administrator computing device 120 may display text entry fields, drop down menus, labels, buttons, or the like to allow for additional customization by the administrator. Accordingly, the administrator computing device 120 may facilitate dynamic template design and configuration that may be performed by the system administrator without requesting additional technical resources and/or backend programming. Such technical resources and/or support may be both time consuming and expensive. Accordingly, by generating the template design, time delay and cost associated with template designs and modifications may both be reduced.

In some instances, in displaying the template design interface, the administrator computing device 120 may display a tool that may provide an administrator with additional functionality. For example, the administrator computing device 120 may enable the administrator to create new alerts, deactivate existing alerts, create new strategic plans, edit a strategic plan status, open and/or close a strategic plan, activate and/or deactivate data elements, upload spreadsheet data, set page visibility based on markets and job role (e.g., based on an assigned market and/or role of an employee, portions of a page may be visible or concealed), configure available edits for particular elements (e.g., some data entry fields may be locked while others are available, or the like), override provided data, create/manage documents, perform template cloning (e.g., copying a page/template from one year to the next), or the like. In some instances, in displaying the template design interface, the administrator computing device 120 may display a web interface.

At step 205, the administrator computing device 120 may receive one or more template layout inputs. For example, in receiving the one or more template layout inputs, the administrator computing device 120 may receive an input (e.g., from an administrative user) requesting that a text box, data entry field, image, drop down menu, label, button, or other template layout feature be added to, removed from, or moved on the interface. For example, the administrator computing device 120 may receive an input requesting that a text box be added in the top middle of the template stating "Please input your top three biggest local competitors," and that three boxes should be placed below, each being available for input of a competitor name (e.g., as is shown in FIG. 3). In this example, the administrator computing device 120 may receive one or more inputs moving the placement of these template layout features and/or otherwise modifying the template. In some instances, the administrator computing device 120 may also receive one or more inputs defining HyperText Markup Language (HTML) controls and/or other properties for the various template layout features. In some instances, the administrator computing device 120 may save the template layout in response to receiving an input indicating that the template has been completed. In these instances, the administrator computing device 120 may store the template layout as a data object such as a JavaScript Object Notation (JSON) object. In some instances, the administrator computing device 120 may receive an input from an administrator indicating that the template should be saved, but is not yet completed. In these instances, the administrator computing device 120 may store the template layout without making it available to other employees. Eventually, the administrator computing device 120 may receive an input from the administrator indicating that the template is completed and should be published to other market employees. Once this input is received, the administrator computing device 120 may proceed to step 206.

Figure 2B:
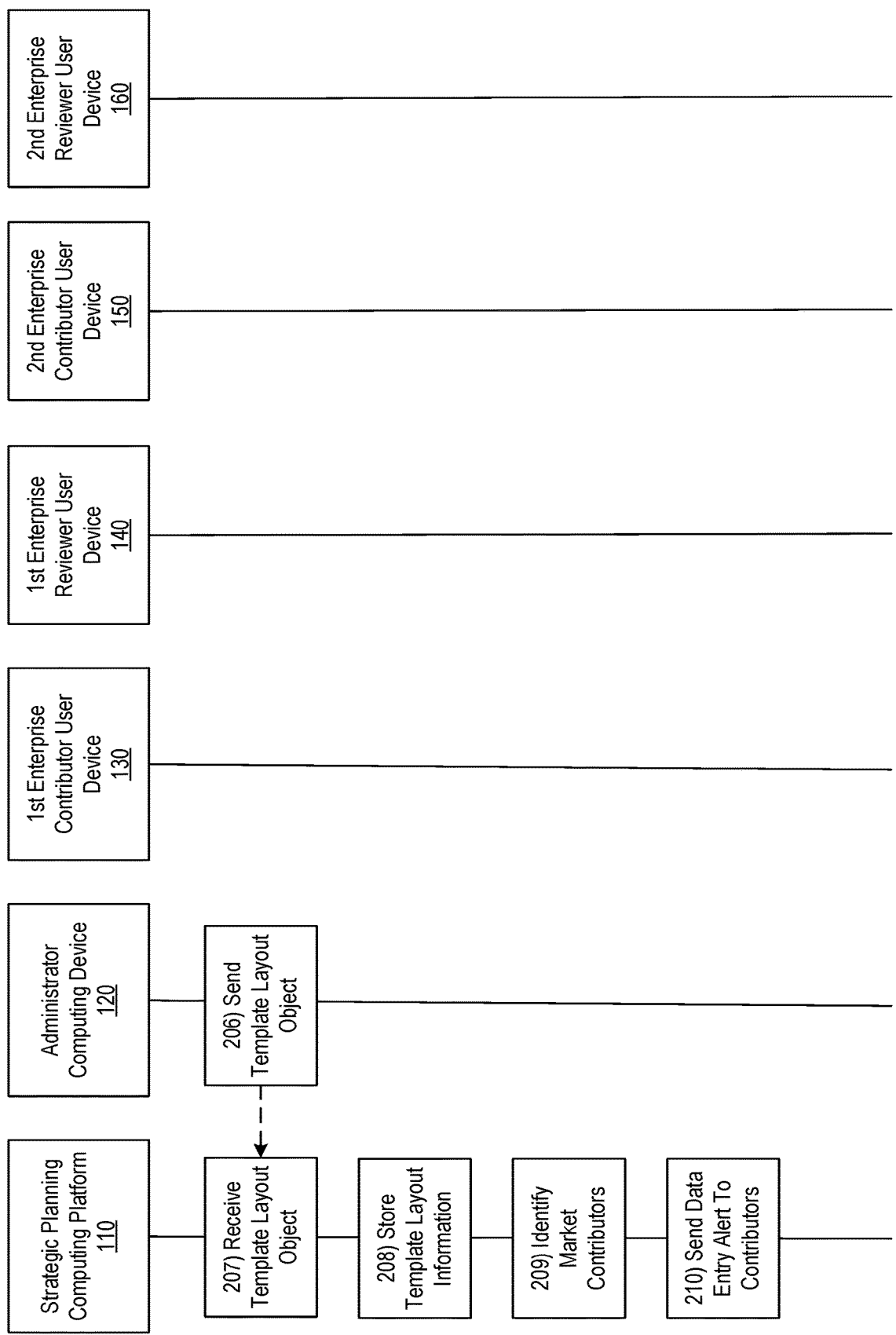

Referring to FIG. 2B, at step 206, the administrator computing device 120 may send, share, or otherwise provide the data object, generated at step 205, that specifies the template layout. For example, the administrator computing device 120 may send the data object to the strategic planning computing platform 110 while the first wireless data connection is established. In one or more instances, in sending the data object, the administrator computing device 120 may send a single JSON response to the strategic planning computing platform 110.

At step 207, the strategic planning computing platform 110 may receive or otherwise access the data object sent at step 206. In one or more instances, the strategic planning computing platform 110 may receive the data object via the communication interface 113 and while the first wireless data connection is established.

At step 208, the strategic planning computing platform 110 may store the data object received at step 207 using one or more key value pairs. For example, the strategic planning computing platform 110 may store a correlation between each element included in the template layout information and a location of the corresponding element. In some instances, the strategic planning computing platform 110 may store the correlation by storing an identifier of an element to be displayed on the template (e.g., text box, picture, or the like) as a key and storing coordinates of the element location and/or other element properties as a value. In these instances, the strategic planning computing platform 110 may store these key value pairs in a first data table.

At step 209, the strategic planning computing platform 110 may identify one or more market contributors. For example, the strategic planning computing platform 110 may identify one or more user accounts associated with individuals who should be prompted to provide data for inclusion in an aggregate data collection representing a plurality of markets serviced by an organization (e.g., such as a financial institution). For example, the strategic planning computing platform 110 may access an employment database associated with the financial institution to identify a position (e.g., job title) associated with each employee of the organization. Based on the job titles, the strategic planning computing platform 110 may identify, for each market, a subset of employers who should be asked to contribute data. Additionally or alternatively, the strategic planning computing platform 110 may identify the market contributors based on other information such as prior contributors, tenure at the organization, or the like.

At step 210, the strategic planning computing platform 110 may send, to each market contributor identified at step 209, a data entry alert. For example, the strategic planning computing platform 110 may send a message to user accounts (e.g., email accounts or the like) associated with the respective market contributors requesting that they provide data pertaining to their respective markets (e.g., top competitors, top industries, sales goals, sales numbers, or the like). In some instances, the strategic planning computing platform 110 may send data entry alerts to the various market contributors requesting different data from each of the market contributors (e.g., specific to their role, market, or the like).

Figure 2C:
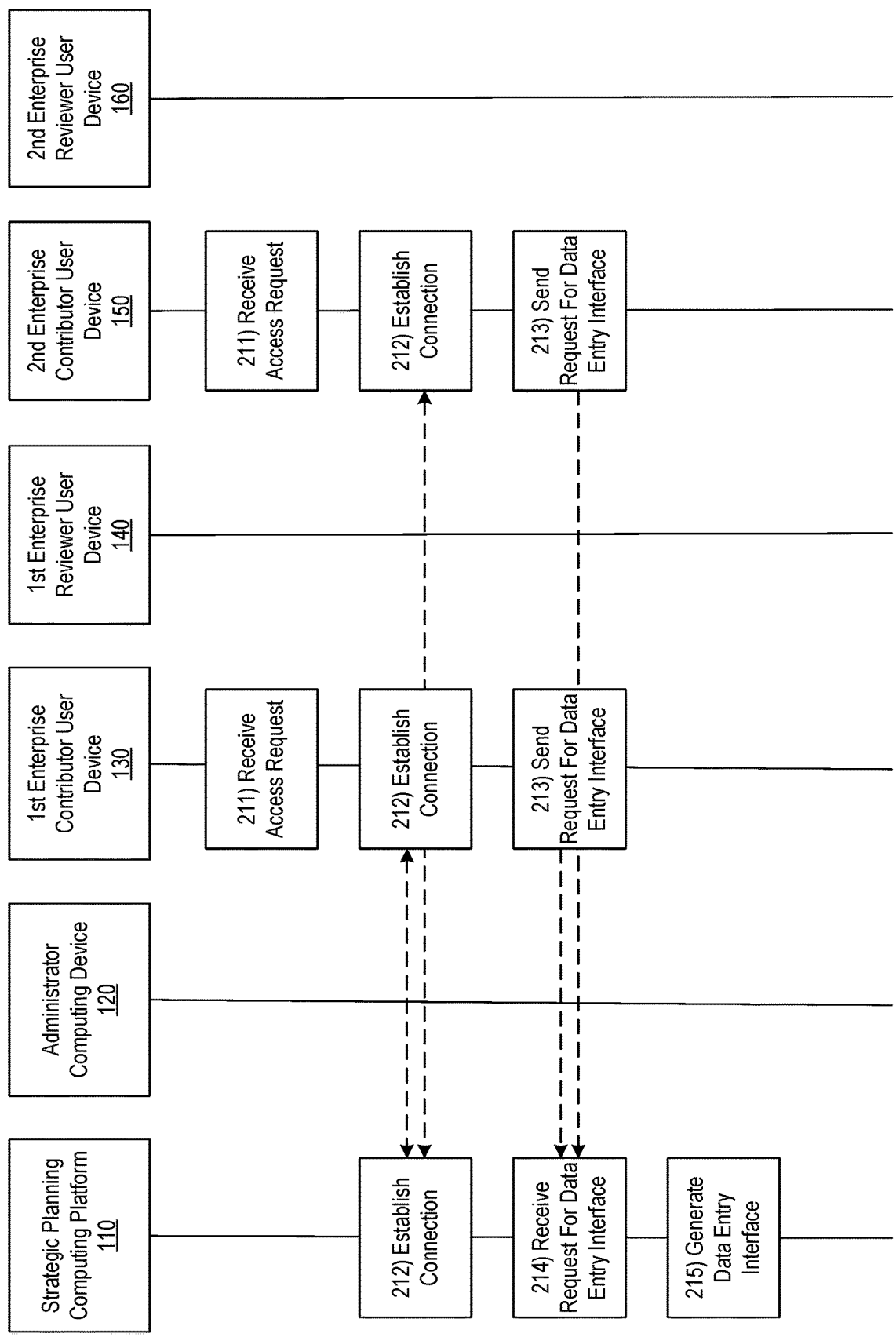

Referring to FIG. 2C, at step 211, one or more enterprise contributor user devices (e.g., first enterprise contributor user device 130, second enterprise contributor user device 150, or the like) may receive a request (e.g., from a user of the respective device) to access a data entry interface (e.g., in response to receiving the data entry alerts sent at step 209). In some instances, the one or more enterprise contributor user devices may receive an input corresponding selecting a link in a message sent at step 210. For example, the message may indicate, "Please click here to access a data entry interface."

At step 212, the first enterprise contributor user device 130 may establish a connection with the strategic planning computing platform 110. In one or more instances, the first enterprise contributor user device 130 may establish a second wireless data connection with the strategic planning computing platform 110 to link the first enterprise contributor user device 130 to the strategic planning computing platform 110. In some instances, the first enterprise contributor user device 130 may identify whether or not a connection is already established with the strategic planning computing platform 110. If a connection is already established with the strategic planning computing platform 110, the first enterprise contributor user device 130 might not re-establish the second wireless data connection. If a connection is not already established, the first enterprise contributor user device 130 may establish the second wireless data connection as described herein. In some instances, additional enterprise contributor user devices (e.g., second enterprise contributor user device 150) may also establish connections with the strategic planning computing platform 110.

At step 213, the first enterprise contributor user device 130 may send, share, or otherwise provide a request for the data entry interface to strategic planning computing platform 110. In one or more instances, the first enterprise contributor user device 130 may send the request for the data entry interface while the second wireless data connection is established. In some instances, additional enterprise contributor user devices (e.g., second enterprise contributor user device 150) may also send requests for the data entry interface.

At step 214, the strategic planning computing platform 110 may receive or otherwise access the request for the data entry interface sent at step 213. In one or more instances, the strategic planning computing platform 110 may receive the request for the data entry interface via the communication interface 113 and while the second wireless data connection is established. In some instances, the strategic planning computing platform 110 may receive additional requests for the data entry interface from additional enterprise contributor user devices (e.g., second enterprise contributor user device 150). In one or more instances, in receiving the request for the data entry interface, the strategic planning computing platform 110 may identify a sender of the request for the data entry interface as a market contributor (e.g., by indexing an account associated with the sender to identify a job title associated with the sender, or the like).

At step 215, the strategic planning computing platform 110 may generate the data entry interface using the template layout information stored at step 208. For example, the strategic planning computing platform 110 may access the one or more stored key value pairs indicating what data elements to include in the data entry interface and locations of each element. Based on these stored key value pairs, the strategic planning computing platform 110 may generate data entry interface information that may be used to generate the data entry interface. In other instances, the strategic planning computing platform 110 may generate the data entry interface based on the stored key value pairs. In some instances, the strategic planning computing platform 110 may generate a data entry interface specific to the market contributor identified at step 214. For example, the strategic planning computing platform 110 may generate a data entry interface where certain fields, information, and/or other data objects are editable, locked, available, concealed, or the like based on an identity of the market contributor.

Figure 2D:
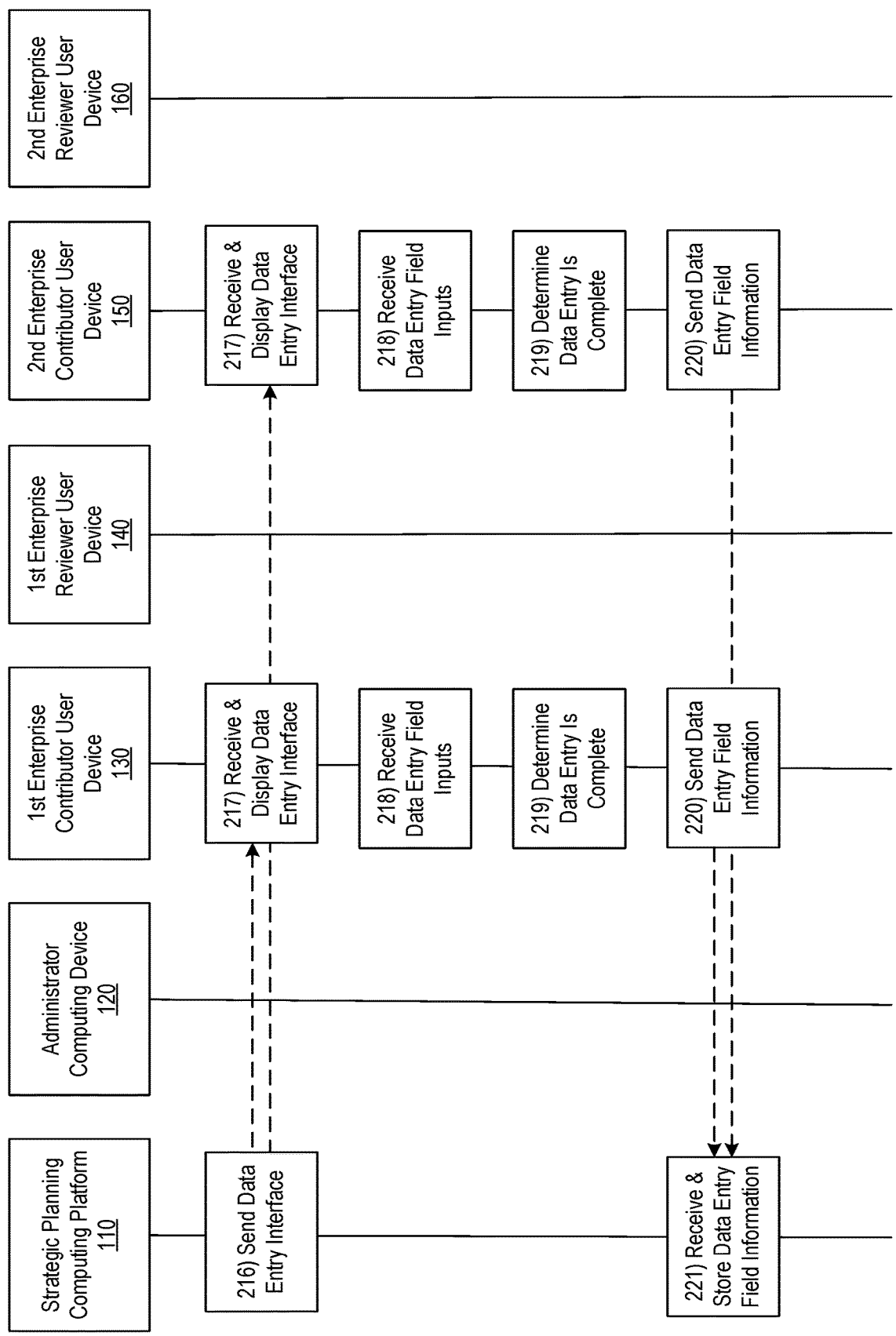

Referring to FIG. 2D, at step 216, the strategic planning computing platform 110 may send, share, or otherwise provide the data entry interface and/or data entry interface information generated at step 215 to the first enterprise contributor user device 130. In one or more instances, the strategic planning computing platform 110 may send the data entry interface information to the first enterprise contributor user device 130 via the communication interface 113 and while the second wireless data connection is established. In some instances, the strategic planning computing platform 110 may send the data entry interface information to additional enterprise contributor user devices (e.g., second enterprise contributor user device 150). In some instances, the strategic planning computing platform 110 may send, along with the data entry interface information, one or more commands directing the first enterprise contributor user device 130 to generate and display a first version of the data entry interface based on the identity of the market contributor (e.g., that may be different than other versions of the data entry interface which may be displayed to other market contributors and/or reviewers). In these instances, the strategic planning computing platform 110 may enable the first enterprise contributor user device 130 to selectively enable or disable fields based on recipient information (e.g., information about the recipient's role and/or title within the enterprise organization).

At step 217, the first enterprise contributor user device 130 may receive or otherwise access the data entry interface and/or data entry interface information from the strategic planning computing platform 110. In one or more instances, the first enterprise contributor user device 130 may receive the data entry interface and/or data entry interface information while the second wireless connection is established. In instances where data entry interface information was received, the first enterprise contributor user device 130 may generate the data entry interface using the data entry interface information and then subsequently display the data entry interface information. In instances where the data entry interface was received, the first enterprise contributor user device 130 may simply display the data entry interface.

In some instances, in displaying the data entry interface, the first enterprise contributor user device 130 may display a graphical user interface similar to graphical user interface 305, which is shown in FIG. 3. For example, the first enterprise contributor user device 130 may display one or more interfaces requesting input specific to a market corresponding to an account accessing the data entry interface. For example, the first enterprise contributor user device 130 may display one or more interfaces requesting the top three local competitors in a particular market. For example, a user of a first user account may access the data entry interface, and may be affiliated with a first market (e.g., a local market, regional market, or the like). In this example, the user of the first account may be prompted to input, via the graphical user interface 305, the top three competitors in the first market.

In some instances, additional enterprise contributor user devices (e.g., second enterprise contributor user device 150)

may receive and display the data entry interface. In these instances, a user of a second user account may access the data entry interface, and may be affiliated with a second market (e.g., a local market, regional market, or the like different from the first market). In this example, the user of the second account may be prompted to input, via the data entry interface, the top three competitors in the second market. Although top competitors are described herein as being displayed on the data entry interface, it should be understood that the data entry interface may prompt market contributors for a wide variety of additional or alternative data corresponding to their respective markets, with the purpose being to gather market specific goals and/or information. In some instances, in displaying the data entry interface, the first enterprise reviewer user device 140 may display a tool with a plurality of links, tabs, sections, pages, or the like, that a user of the first enterprise reviewer user device 140 may use to navigate the data entry interface and/or use to enter and/or review data.

In one or more instances, once the first enterprise reviewer user device 140 receives the data entry interface, the administrator computing device 120 may generate an interface that allows an administrative user to dynamically generate alerts for specific market contributors (e.g., a user of the first enterprise contributor user device 130, or the like) such as an alert requesting a particular type of data from the given contributor based on their roles within the organization. Additionally or alternatively, the administrator computing device 120 may have an interface including alert buttons that allow the administrative user to push alerts to various users. Additionally or alternatively, the administrator computing device 120 may display a progress bar indicating progress of data input with regard to specific contributors and/or data input across the board.

At step 218, the first enterprise contributor user device 130 may receive one or more data entry field inputs based on the data entry interface displayed at step 217. To follow the example described above at step 217, the first enterprise contributor user device 130 may receive one or more data entry field inputs corresponding to the top three competitors for the first market. In some instances, additional enterprise contributor user devices (e.g., second enterprise contributor user device 150) may receive one or more data entry field inputs corresponding to the top three competitors for their respective markets (e.g., the second market, or the like). In some instances, in receiving the one or more data entry inputs, the first enterprise contributor user device 130 may update a progress bar displayed on the data entry interface indicating how much of the requested data has been input. Additionally or alternatively, the first enterprise contributor user device 130 may share this progress with other devices (e.g., strategic planning computing platform 110, administrator computing device 120, first enterprise reviewer user device 140, second enterprise reviewer user device 160, or the like) and these other devices may similarly cause display of the progress (e.g., individual progress at the first enterprise contributor user device 130, overall progress based on multiple user devices, or the like).

At step 219, the first enterprise contributor user device 130 may determine that data entry is complete at the data entry interface. For example, the first enterprise contributor user device 130 may determine that all data requested by the data entry interface has been input. To continue with the example described above, the first enterprise contributor user device 130 may determine, for example, that a first, second, and third competitor have all been specified via the data entry user interface. In one or more instances, the first enterprise contributor user device 130 may determine that a predetermined period of time has expired and that data entry has not been completed. In these instances, the first enterprise contributor user device 130 may generate and display an alert indicating that the data entry has not been completed and requesting completion. Additionally or alternatively, in these instances, the first enterprise contributor user device 130 may notify the strategic planning computing platform 110 and/or the administrator computing device 120 indicating that the data entry has not been completed. In some instances, one or more additional enterprise contributor user devices (e.g., second enterprise contributor user device 150) may also determine that data entry is complete at other data entry interfaces displayed by the respective devices in a manner similar to that described herein.

At step 220, after determining that data entry is complete, the first enterprise contributor user device 130 may send, share, or otherwise provide, to the strategic planning computing platform 110, data entry field information corresponding to the data entry inputs received at step 218. In one or more instances, the first enterprise contributor user device 130 may send the data entry field information to the strategic planning computing platform 110 while the second wireless data connection is established. In some instances, one or more additional enterprise contributor user devices (e.g., second enterprise contributor user device 150) may also send data entry field information to the strategic planning computing platform 110.

At step 221, the strategic planning computing platform 110 may receive or otherwise access the data entry field information sent at step 220. In one or more instances, the strategic planning computing platform 110 may receive the data entry field information via the communication interface 113 and while the second wireless data connection is established. After receiving the data entry field information, the strategic planning computing platform 110 may store the data entry field information using a plurality of key value pairs. For example, the strategic planning computing platform 110 may store a correlation between the data entry field information and the corresponding data entry fields for each piece of data entry field information. In this example, the strategic planning computing platform 110 may store an identifier of each data entry field as a key and may store the corresponding data entry field information as corresponding values. To continue with the illustrative example described above, the strategic planning computing platform 110 may store a plurality of key value pairs indicating "Competitor #1: Name of Top Competitor," "Competitor #2: Name of Second Highest Competitor," "Competitor #3: Name of Third Highest Competitor."

In some instances, the strategic planning computing platform 110 may store this plurality of key value pairs in a second data table (e.g., different than the first data table generated based on the key value pairs regarding the template layout at step 208). In some instances, the strategic planning computing platform 110 may receive data entry field information from one or more additional enterprise contributor user devices (e.g., second enterprise contributor user device 150). In these instances, the strategic planning computing platform 110 may receive data entry field information corresponding to a plurality of markets (e.g., top competitors for each of the markets, or the like). In instances where the strategic planning computing platform 110 receives data entry field information corresponding to a plurality of markets, the strategic planning computing platform 110 may store the data entry field information in the second data table based on its corresponding market (e.g., along with a market identifier, tag, or the like). In some instances, the strategic planning computing platform 110 may store data entry field information corresponding to different markets in specific tables each associated with the various markets.

In some instances, the strategic planning computing platform 110 may define inputs to the second data table as an array so that a single data element may capture multiple values corresponding to a single key. For example, the strategic planning computing platform 110 may store data entry field information that contains multiple values to be output in a single table (e.g., a table indicating "Competitor #1," "Competitor #2," and "Competitor #3").

Figure 2E:
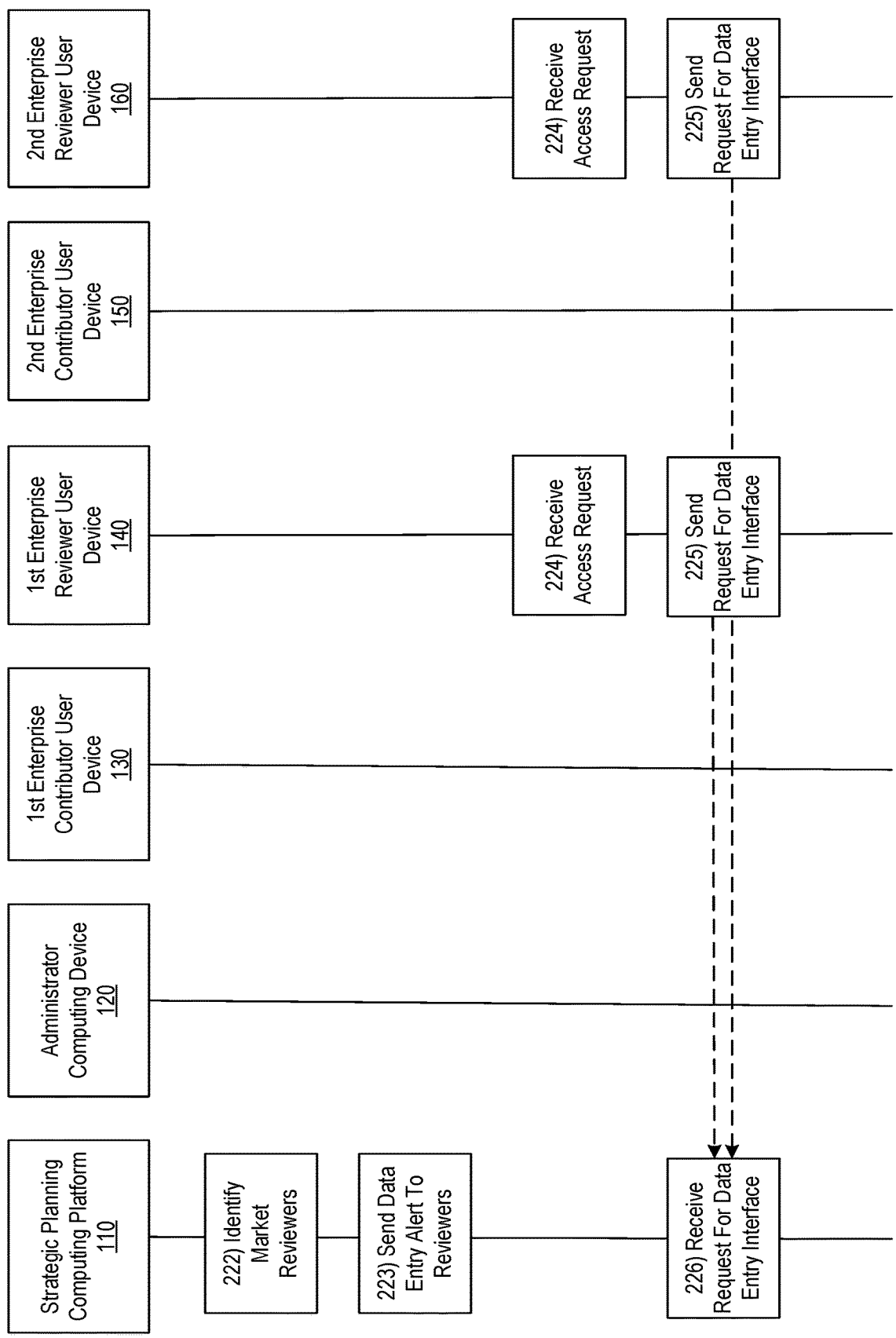

Referring to FIG. 2E, at step 222, the strategic planning computing platform 110 may identify one or more market reviewers. In some instances, in identifying the one or more market reviewers, the strategic planning computing platform 110 may perform actions similar to those described at step 209 with regard to identification of the one or more market contributors.

For example, the strategic planning computing platform 110 may identify one or more user accounts associated with individuals who should be prompted to provide data for inclusion in an aggregate data collection representing a plurality of markets serviced by an organization (e.g., such as a financial institution), but who also may be prompted to review data received from one or more market contributors (e.g., the data entry field information received at step 221). For example, the strategic planning computing platform 110 may access an employment database associated with the financial institution to identify a position (e.g., job title) associated with each employee of the organization. Based on the job titles, the strategic planning computing platform 110 may identify, for each market, a subset of employers who should be asked to contribute and/or review data. For example, the strategic planning computing platform 110 may identify a plurality of managers for each market. Additionally or alternatively, the strategic planning computing platform 110 may identify the market reviewers based on other information such as prior contributors, tenure at the organization, or the like.

At step 223, the strategic planning computing platform 110 may send a data entry alert to the one or more market reviewers identified at step 222. For example, the strategic planning computing platform 110 may send a message to user accounts (e.g., email accounts or the like) associated with the respective market reviewers requesting that they provide data pertaining to their respective markets (e.g., top competitors, top industries, sales goals, sales numbers, or the like). In this example, the strategic planning computing platform 110 may request different data from the market reviewers than was requested from the market contributors at step 210. For example, the strategic planning computing platform 110 may request high priority data from the market reviewers that might not be available to the market contributors. Additionally or alternatively, the strategic planning computing platform 110 may send a message to the respective market reviewers requesting that they review data received from market contributors in their corresponding market, monitor progress of market contributors in their corresponding market, or the like. For example, the strategic planning computing platform 110 may send a message to a market reviewer in the first market request that they review data provided by market contributors from the first market. In some instances, the strategic planning computing platform 110 may send data entry alerts to the various market reviewers that request different types of data from each of the market reviewers (e.g., specific to their role, market, or the like).

At step 224, one or more enterprise reviewer user devices (e.g., first enterprise reviewer user device 140, second enterprise reviewer user device 160, or the like) may receive a request to access a data entry interface (e.g., in response to receiving the data entry alerts sent at step 223). In some instances, the one or more enterprise contributor user devices may receive an input corresponding to selecting a link in a message sent at step 223. For example, the message may indicate, "Please click here to access a data entry interface." In some instances, requests to access the data entry interface may be received at one or more additional enterprise contributor user devices (e.g., second enterprise contributor user device 150). In some instances, actions performed at step 224 may be similar to those described above with regard to step 211.

At step 225, the first enterprise reviewer user device 140 may send, share, or otherwise provide a request to access the data entry interface. For example, the first enterprise reviewer user device 140 may establish a connection with the strategic planning computing platform 110 and may send the request to access the data entry interface while the connection is established. In this example, the first enterprise reviewer user device 140 may establish a third wireless data connection with the strategic planning computing platform 110 to link the first enterprise reviewer user device 140 to the strategic planning computing platform 110. In some instances, the first enterprise reviewer user device 140 may identify whether or not a connection is already established with the strategic planning computing platform 110. If the first enterprise reviewer user device 140 identifies that a connection is already established with the strategic planning computing platform 110, it might not re-establish the connection. If the first enterprise reviewer user device 140 identifies that a connection is not already established with the strategic planning computing platform 110, it may establish the third wireless data connection as described herein. In some instances, one or more additional enterprise reviewer user devices (e.g., second enterprise reviewer user device 160) may also send requests to the strategic planning computing platform 110 for the data entry interface. In some instances, in sending the request to access the data entry interface, the first enterprise reviewer user device 140 may perform one or more actions similar to those described above at step 213.

At step 226, the strategic planning computing platform 110 may receive or otherwise access the request for the data entry interface sent at step 226. In one or more instances, the strategic planning computing platform 110 may receive the request for the data entry interface via the communication interface 113 while the third wireless data connection is established. In some instances, in receiving the request for the data entry interface, the strategic planning computing platform 110 may perform actions similar to those described above with regard to step 214. In one or more instances, in receiving the request for the data entry interface, the strategic planning computing platform 110 may identify a sender of the request for the data entry interface as a market reviewer (e.g., by indexing an account associated with the sender to identify a job title associated with the sender, or the like).

Figure 2F:
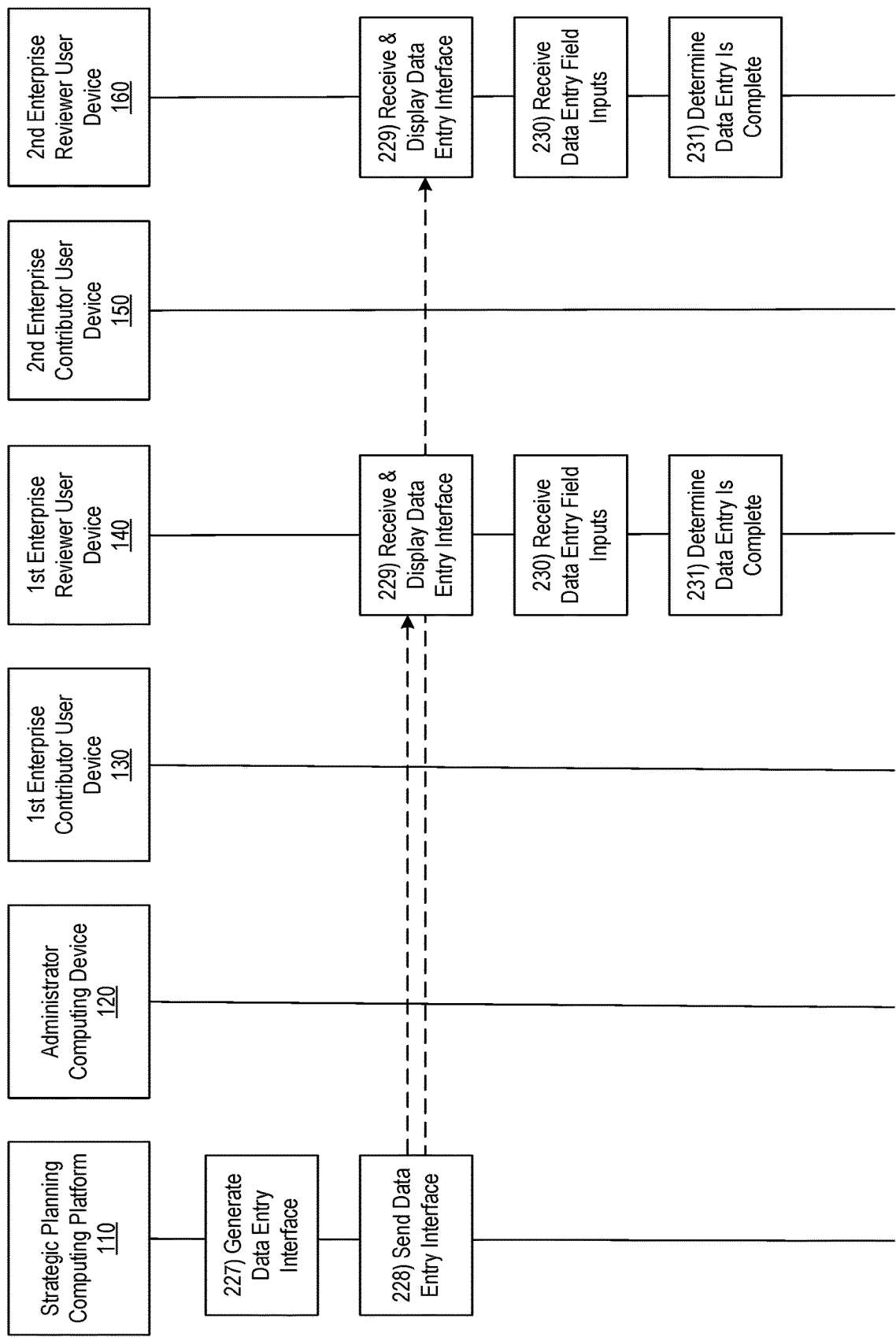

Referring to FIG. 2F, at step 227, the strategic planning computing platform 110 may generate the data entry interface. In some instances, in generating the data entry interface, the strategic planning computing platform 110 may perform one or more actions similar to those described above with regard to step 215 (e.g., by using the key value pairs stored at step 207). In some instances, the strategic planning computing platform 110 may generate a data entry interface specific to the market reviewer identified at step 226. For example, the strategic planning computing platform 110 may generate a data entry interface where certain fields, information, and/or other data objects are editable, locked, available, concealed, or the like based on an identity of the market reviewer.

At step 228, the strategic planning computing platform 110 may send, share, or otherwise provide the data entry interface, generated at step 227, to the first enterprise reviewer user device 140. In one or more instances, the strategic planning computing platform 110 may send the data entry interface via the communication interface 113 and while the third wireless data connection is established. In some instances, rather than sending the data entry interface itself, the strategic planning computing platform 110 may send data entry interface information that may be used by the first enterprise reviewer user device 140 to generate the data entry interface. In some instances, the strategic planning computing platform 110 may send the data entry interface to one or more additional enterprise reviewer user devices (e.g., second enterprise reviewer user device 160). In sending the data entry interface, the strategic planning computing platform 110 may perform actions similar to those described above with regard to step 216.

In some instances, the strategic planning computing platform 110 may send, along with the data entry interface information, one or more commands directing the first enterprise reviewer user device 140 to generate and display a second version of the data entry interface based on the identity of the market reviewer. In addition, the second version of the data entry interface may be different than other versions of the data entry interface that may be displayed to other market contributors and/or reviewers, such as the first version of the data entry interface described at step 216. In these instances, the strategic planning computing platform 110 may enable the first enterprise reviewer user device 140 to selectively enable or disable fields based on recipient information (e.g., information about the recipient's role and/or title within the enterprise organization). Among other things, in sending the data entry interface to a market review in comparison to a market contributor, the strategic planning computing platform 110 may send a data entry interface that may be completely unlocked for editing (as opposed to a contributor interface that may have certain data entry fields locked), may request high priority and/or confidential information, may identify an individual that made the most recent updates to the data entry interface, may show progress of corresponding market contributors, or the like.

At step 229, the first enterprise reviewer user device 140 may receive or otherwise access the data entry interface sent at step 228 and may display the data entry interface. In some instances, the first enterprise reviewer user device 140 may receive the data entry interface while the third wireless data connection is established. In some instances, in displaying the data entry interface, the first enterprise reviewer user device 140 may display a graphical user interface similar to graphical user interface 405, which is shown in FIG. 4. For example, as shown in FIG. 4, the data entry interface may indicate progress of various market contributors in providing their requested data, and may include an option to send a reminder message to each respective market contributor. For example, a market reviewer associated with a first market may be accessing the graphical user interface 405, and the graphical user interface 405 may display progress of market contributors (e.g., contributor 1 and contributor 2) associated with the first market. In some instances, in displaying the data entry interface, the first enterprise reviewer user device 140 may prompt for data similar to the data requested by graphical user interface 305. In some instances, the data entry interface displayed by the first enterprise reviewer user device 140 may be different than the data entry interface displayed by the first enterprise contributor user device 130 (e.g., at step 217). For example, the data entry interface displayed by the first enterprise contributor user device 130 may include one or more locked fields, interfaces or the like that may be visible and/or unlocked in the data entry interface displayed by the first enterprise reviewer user device 140. Additionally or alternatively, the data entry interface displayed by the first enterprise reviewer user device 140 may include status bars indicating progress of market contributors, options to send reminder notifications, or the like, that may not be available on the data entry interface displayed by the first enterprise contributor user device 130. In one or more instances, in displaying the data entry interface, the first enterprise reviewer user device 140 may display an interface that includes at least a portion of the data entry field information from the market contributors received at step 221. In some instances, in displaying the data entry interface, the first enterprise reviewer user device 140 may display a tool with a plurality of links, tabs, sections, pages, or the like, that a user of the first enterprise reviewer user device 140 may use to navigate the data entry interface and/or enter/review data. In some instances, the data entry interface may also be received and displayed by one or more additional enterprise reviewer user devices (e.g., second enterprise reviewer user device 160).

In one or more instances, once the first enterprise reviewer user device 140 receives the data entry interface, the administrator computing device 120 may generate an interface that allows an administrative user to dynamically generate alerts for specific market reviewers (e.g., a user of the first enterprise reviewer user device 140, or the like) such as an alert requesting a particular type of data from the given reviewer based on their roles within the organization. Additionally or alternatively, the administrator computing device 120 may include alert buttons on the interface that allow the administrative user to push alerts to various users. Additionally or alternatively, the administrator computing device 120 may display a progress bar indicating progress of data input with regard to specific reviewers and/or data input across the board.

At step 230, the first enterprise reviewer user device 140 may receive one or more data entry field inputs. In receiving the data entry field inputs, the first enterprise reviewer user device 140 may perform actions similar to those described above at step 218, but in some instances, the first enterprise reviewer user device 140 may receive different data entry field inputs than were received by the first enterprise contributor user device 130 at step 218. In some instances, the data entry field inputs may also be received by one or more additional enterprise reviewer user devices (e.g., second enterprise reviewer user device 160). In some instances, in receiving the one or more data entry inputs, the first enterprise reviewer user device 140 may update a progress bar displayed on the data entry interface indicating how much of the requested data has been input. Additionally or alternatively, the first enterprise reviewer user device 140 may share this progress with other devices (e.g., strategic planning computing platform 110, administrator computing device 120, second enterprise reviewer user device 160, or the like) and these other devices may similarly cause display of the progress (e.g., individual progress at the first enterprise reviewer user device 140, overall progress based on multiple user devices, or the like).

At step 231, the first enterprise reviewer user device 140 may determine whether or not data entry is complete. In some instances, in determining whether or not the data entry is complete, the first enterprise reviewer user device 140 may perform one or more actions similar to those described above with regard to step 219. In some instances, a determination of whether or not data entry is complete may be made at one or more additional enterprise contributor user devices (e.g., second enterprise contributor user device 150).

Figure 2G:
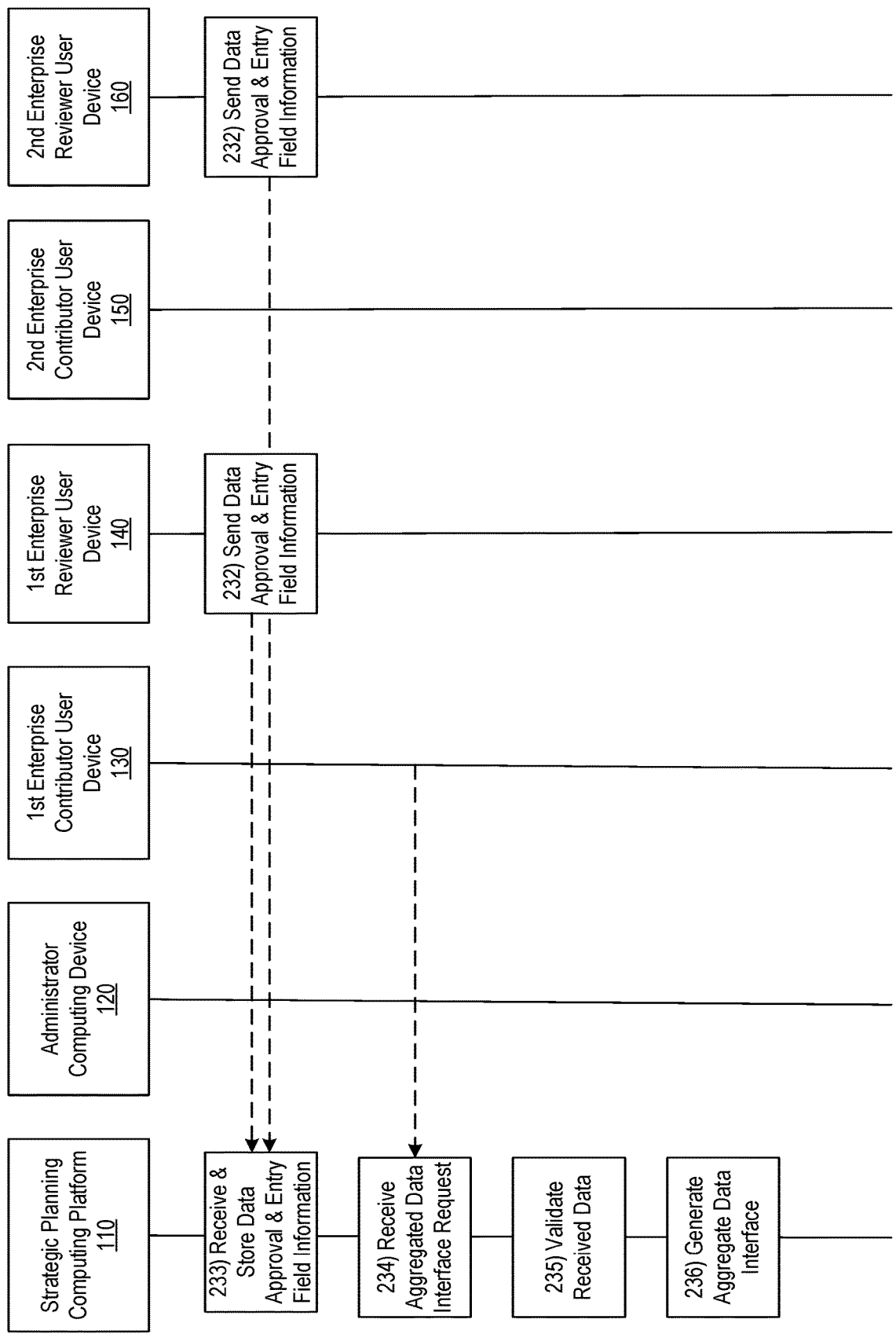

Referring to FIG. 2G, at step 232, first enterprise reviewer user device 140 may prompt for data approval. For example, the first enterprise reviewer user device 140 may prompt for approval of the data entry field information from corresponding market contributors (e.g., market contributors in the same market as the market reviewer accessing the data entry interface at the first enterprise reviewer user device 140). In some instances, the first enterprise reviewer user device 140 may receive a data acceptance input from a user of the first enterprise reviewer user device 140 (e.g., a market reviewer). In some instances, the first enterprise reviewer user device 140 may display, as part of the data entry interface, a document review section, which may include links to other documents and/or otherwise make available the data input by market contributors in an associated market (e.g., a subset of the data entry field information received at step 221).

After receiving the data acceptance input from the user of the first enterprise reviewer user device 140, the first enterprise reviewer user device 140 may send, share, or otherwise provide a message, indicating that the data entry field information from the corresponding market contributors has been verified, to the strategic planning computing platform 110. Additionally or alternatively, the first enterprise reviewer user device 140 may send data entry field information, indicating the data entry field inputs received from a user of the first enterprise reviewer user device 140 at step 230. In some instances, the first enterprise reviewer user device 140 may send the message indicating that the data entry field information has been verified and/or communicating the data entry field information while the third wireless data connection is established. In some instances, one or more additional enterprise reviewer user devices (e.g., second enterprise reviewer user device 160) may also send verification messages and/or communicate data entry field information to the strategic planning computing platform 110.

At step 233, the strategic planning computing platform 110 may receive or otherwise access the message indicating that the data entry field information from the corresponding market contributors has been verified and/or communicating the data entry information from the first enterprise reviewer user device 140. In some instances, the strategic planning computing platform 110 may receive the message indicating that the data entry field information from the corresponding market contributors has been verified and/or communicating the data entry information via the communication interface 113 and while the third wireless data connection is established. In some instances, the strategic planning computing platform 110 may store the data entry field information from the first enterprise reviewer user device 140 using a plurality of key value pairs in the second data table (e.g., the same table as the data entry field information received from the first enterprise contributor user device 130 at step 221). In storing this data entry field information, the strategic planning computing platform 110 may perform actions similar to those described above with regard to step 221. In some instances, the strategic planning computing platform 110 may define inputs to the second data table as an array so that a single data element may capture multiple values corresponding to a single key. For example, the strategic planning computing platform 110 may store data entry field information that contains multiple values to be output in a single table (e.g., a table indicating "Competitor #1," "Competitor #2," and "Competitor #3." In some instances, the strategic planning computing platform 110 may receive data entry field information and/or verification messages from one or more additional enterprise reviewer user devices (e.g., second enterprise reviewer user device 160).

At step 234, the strategic planning computing platform 110 may receive a request (e.g., from the first enterprise contributor user device 130, first enterprise reviewer user device 140, second enterprise contributor user device 150, second enterprise reviewer user device 160, or the like), for an aggregate data interface. For example, the strategic planning computing platform 110 may receive a request from the first enterprise contributor user device 130 requesting a user interface that displays data aggregated from one or more different markets (e.g., some data received from contributors and/or reviewers associated with a first market, some data received from contributors and/or reviewers associated with a second market, or the like). For example, a user of the first enterprise contributor user device 130 may want to view information associated with multiple markets across the enterprise organization as a whole for purposes of evaluating performance, determining goals, giving a strategic planning presentation, or the like.

At step 235, the strategic planning computing platform 110 may validate the data entry field information stored at steps 221 and 233. For example, as an additional layer of data validation beyond manual review by one or more market reviewers at step 232, the strategic planning computing platform 110 may automatically validate the data entry field information based on, for example, a cross market comparison. As an example, the strategic planning computing platform 110 may validate the data entry field information from a first market by comparing it to data entry field information from a plurality of additional markets (e.g., data values within a predetermined threshold deviation, similar words used, or the like). In some instances, the strategic planning computing platform 110 may implement natural language processing to identify similarities and/or discrepancies between data entry field information received from the different markets. In some instances, the strategic planning computing platform 110 may validate the data entry field information automatically in response to receiving the request for the aggregate data interface received at step 234. In other instances, the strategic planning computing platform 110 may automatically validate the data entry field information in response to determining that all data entry field information has been received, that a data validation message has been received from each respective enterprise reviewer user device, or the like.

In some instances, in performing the cross market comparison to validate the data entry field information, the strategic planning computing platform 110 may compare first data entry field information associated with a first market in a first geographic location with other data entry field information associated with a plurality of other markets, each located in a geographic location other than the first geographic location. For example, the strategic planning computing platform 110 may compare data entry field information associated with a market in City #1 against data entry field information associated with the other markets corresponding to other geographic locations in which the enterprise organization operates.

At step 236, the strategic planning computing platform 110 may generate an aggregate data collection interface. In some instances, the strategic planning computing platform 110 may generate the aggregate data collection interface based on the data entry field information received at steps 221 and 233. In doing so, the strategic planning computing platform 110 may access the key value pairs stored at steps 221 and 233, and may aggregate data from across a plurality of markets. For example, based on all of the data entry field information received, the strategic planning computing platform 110 may identify the top three competitors of the enterprise organization across all markets (e.g., by computing a numeric value corresponding to how many times each competitor was included in the data entry field information corresponding to top competitors for each market). In some instances, the strategic planning computing platform 110 may generate the aggregate data collection interface itself. Alternatively, the strategic planning computing platform 110 may generate aggregate data collection interface information that may be used to generate the aggregate data collection interface (e.g., by the first enterprise contributor user device 130, or the like). In some instances, in generating the aggregate data collection interface, the strategic planning computing platform 110 may generate a slideshow presentation, common JSON response, or the like.

In some instances, in generating the aggregate data collection interface, the strategic planning computing platform 110 may generate an aggregate data collection across all participating markets (e.g., the strategic planning computing platform 110 may generate a representation of the enterprise organization as a whole across all markets). Additionally or alternatively, in generating the aggregate data collection interface, the strategic planning computing platform 110 may generate an aggregate data collection for each participating market (e.g., the strategic planning computing platform 110 may generate a data collection that aggregates the data received from various contributors and/or reviewers by market).

Figure 2H:
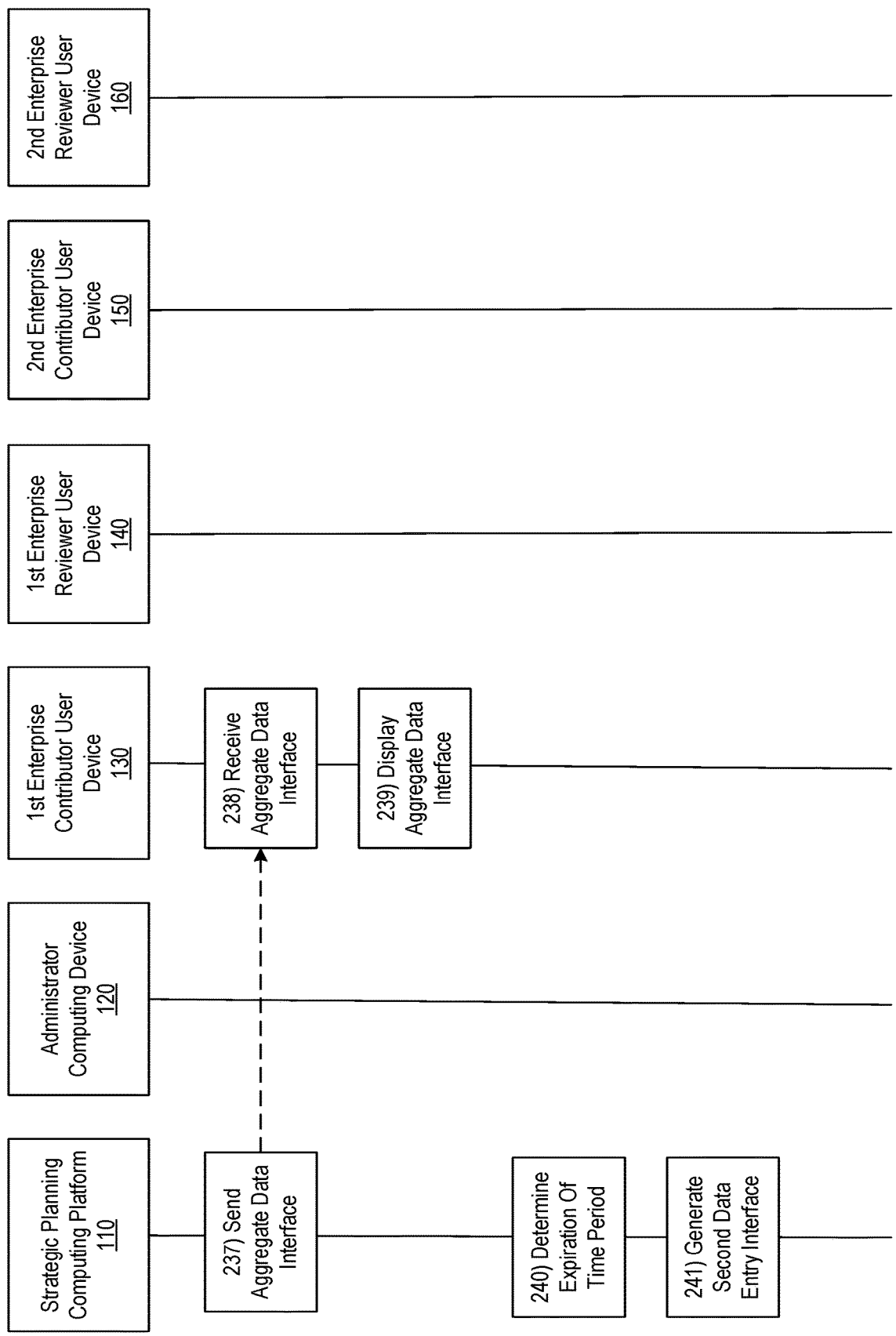

Referring to FIG. 2H, at step 237, the strategic planning computing platform 110 may send, share, or otherwise provide the aggregate data collection interface, generated at step 236, to the first enterprise contributor user device 130. In some instances, the strategic planning computing platform 110 may send the aggregate data interface to the first enterprise contributor user device 130 via the communication interface 113 and while the second wireless data connection is established. In one or more instances, the strategic planning computing platform 110 may send, along with the aggregate data collection interface, one or more commands directing the first enterprise contributor user device 130 to display the aggregate data collection interface. In some instances, the strategic planning computing platform 110 may identify of a sender of the request for the aggregate data collection interface, and may send a version of the aggregate data collection interface specific to that sender (e.g., based on market, job title, or the like). Additionally or alternatively, the strategic planning computing platform 110 may send one or more commands directing the first enterprise contributor user device 130 to generate, based on aggregate data collection interface information, a version of the aggregate data collection interface specific to the sender.

At step 238, the strategic planning computing platform 110 may receive or otherwise access the aggregate data interface sent at step 237. In some instances, the strategic planning computing platform 110 may receive the aggregate data interface while the second wireless data connection is established.

At step 239, the first enterprise contributor user device 130 may display the aggregate data collection interface. In some instances, the first enterprise contributor user device 130 may display the aggregate data collection interface in response to one or more commands received from the strategic planning computing platform 110 directing the first enterprise contributor user device 130 to display the aggregate data collection interface. In some instances, in displaying the aggregate data collection interface, the first enterprise contributor user device 130 may display a graphical user interface similar to graphical user interface 505, which is shown in FIG. 5. For example, the first enterprise contributor user device 130 may display an interface that aggregates top competitors from each market to display top nationwide competitors such as "Competitor #1," "Competitor #2," and "Competitor #3."

In one or more instances, the aggregate data collection interface may be displayed based on a role of the user accessing the aggregate data collection interface (e.g., the interfaces may be tailored based on user role and/or market access within the enterprise organization). Additionally or alternatively, the first enterprise contributor user device 130 may display an option to print the aggregate data collection interface either in whole or in part (e.g., particular sections).

At step 240, the strategic planning computing platform 110 may determine that a predetermined period of time has expired. For example, the strategic planning computing platform 110 may determine that a year has passed since the data entry field information was received, and thus that updated data should be requested to reflect an updated status of the enterprise organization.

At step 241, the strategic planning computing platform 110 may generate, based on the determination that the predetermined period of time expired, a second data entry interface. In generating the second data entry interface, the strategic planning computing platform 110 may perform one or more actions similar to those described above with regard to steps 215 and/or 227 (e.g., using the key value pairs to place specified data elements at specified locations).

Referring to FIG. 2I, at step 242, the strategic planning computing platform 110 may clone previously received data entry field information, received from various market contributors and reviewers, and may populate the second data entry interface with the previously received data entry field information specific to each market. For example, if the top competitors for a first market were identified as "Competitor 1," "Competitor 2," and "Competitor 3," based on the previously received data entry field information, the strategic planning computing platform 110 may populate the second data entry interface with this information. Similarly, the strategic planning computing platform 110 may populate the second data entry interface for a second market with previously received data entry field information for the second market. In doing so, the strategic planning computing platform 110 may allow data to carry over between multiple years, this minimizing an amount of work to be performed by market contributors and/or reviewers in populating the second data entry interface (e.g., they may be able to leave certain data as is if it has not changed, and might not need to re-populate the second data entry interface with information already entered in a previous year). In some instances, once the second data entry interface has been populated by the strategic planning computing platform 110, the strategic planning computing platform 110 may send the second data entry interface to accounts associated with the identified market reviewers and contributors along with a message requesting that updated data entry field information be provided. In some instances, this may cause one or more enterprise user devices (e.g., first enterprise contributor user device 130, first enterprise reviewer user device 140, second enterprise contributor user device 150, second enterprise reviewer user device 160, or the like) to display the second data entry interface.

Although steps 201-242 are primarily described with regard to first enterprise contributor user device 130, first enterprise reviewer user device 140, second enterprise contributor user device 150, and second enterprise reviewer user device 160, it should be understood that more or fewer user devices may be implemented to perform the methods described herein in additional or alternative arrangements.

Figure 6:
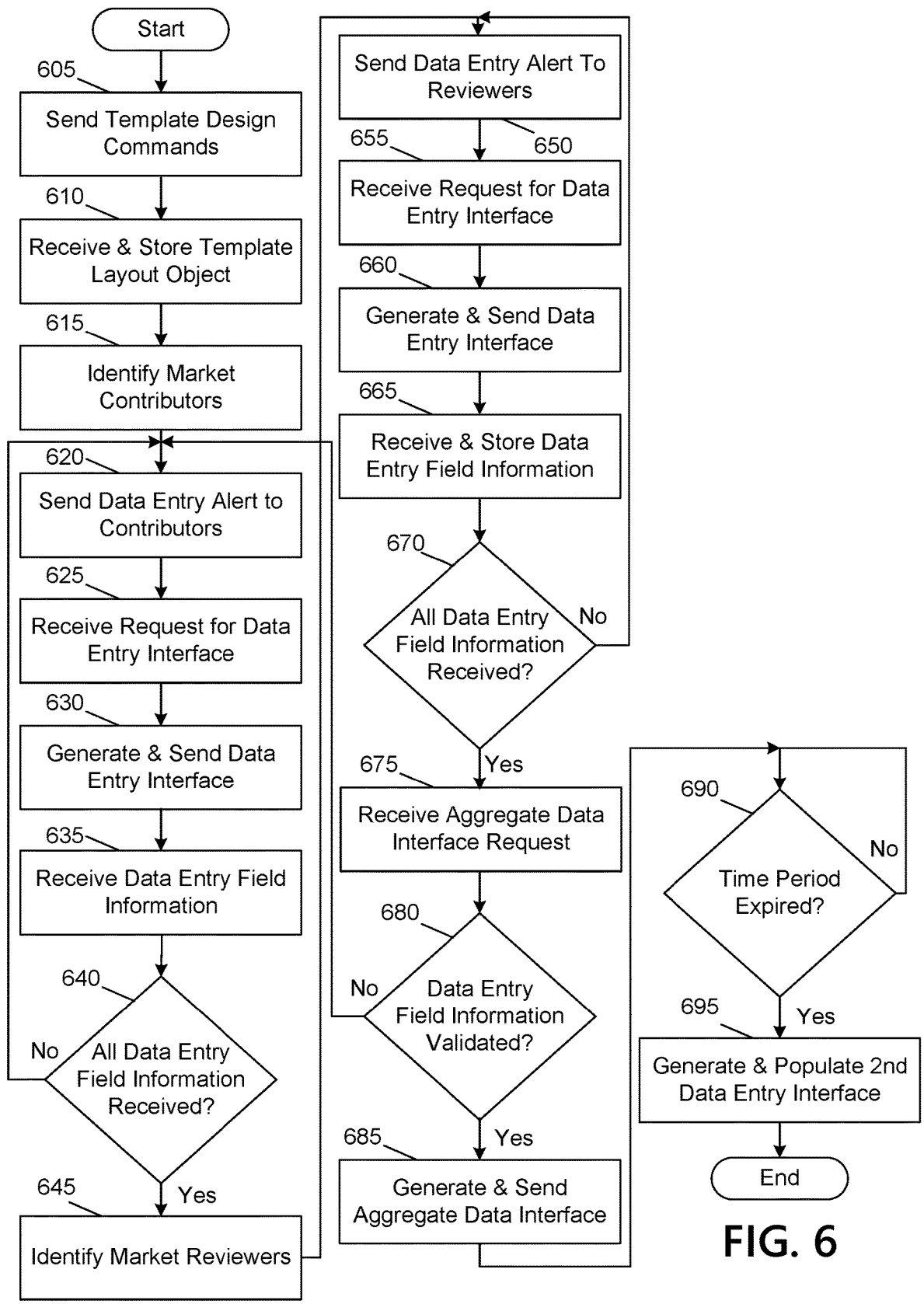
FIG. 6 depicts an illustrative method for dynamically assembling and displaying strategic planning datasets based on collecting, aggregating, and filtering distributed data collections in accordance with one or more example embodiments.

FIG. 6 depicts an illustrative method for dynamically assembling and displaying strategic planning datasets based on collecting, aggregating, and filtering distributed data collections in accordance with one or more example embodiments. Referring to FIG. 6, at step 605, a computing platform having at least one processor, a communication interface, and memory may send one or more commands directing an administrator computing device to display a template design interface. At step 610, the computing platform may receive and store a data object indicating a template layout. At step 615, the computing platform may identify one or more market contributors. At step 620, the computing platform may send a data entry alert to the one or more market contributors requesting that they input data specific to their respective markets. At step 625, the computing platform may receive a request from user devices associated with the one or more market contributors requesting a data entry interface. At step 630, the computing platform may generate and send the data entry interface(s). At step 635, the computing platform may receive data entry field information. At step 640, the computing platform may determine whether or not all data entry field information has been received from the one or more market contributors. If all data entry field information has not yet been received, the computing platform may return to step 620. If all data entry field information has been received, the computing platform may proceed to step 645.

At step 645, the computing platform may identify one or more market reviewers. At step 650, the computing platform may send a data entry alert to the one or more market reviewers requesting that they input data specific to their respective markets and/or review data provided by one or more market contributors from their respective markets. At step 655, the computing platform may receive a request from user devices associated with the one or more market reviewers requesting a data entry interface. At step 660, the computing platform may generate and send the data entry interface(s). At step 665, the computing platform may receive and store data entry field information received from the one or more market reviewers. At step 670, the computing platform may determine whether all data entry field information has been received from the one or more market reviewers. If all data entry field information has not been received, the computing platform may return to step 650. If all data entry field information has been received, the computing platform may proceed to step 675.

At step 675, the computing platform may receive an aggregate data collection interface request from a user device. At step 680, in response to the aggregate data collection interface request, the computing platform may validate the data entry field information received at steps 635 and 665. If the computing platform determines that the data entry field information is not valid, the computing platform may return to step 620. If the computing platform determines that the data entry field information is valid, the computing platform may proceed to step 685.

At step 685, the computing platform may generate and send the aggregate data collection interface to the user device. At step 690, the computing platform may determine whether a predetermined period of time has expired. Once the predetermined period of time has expired, the computing platform may proceed to step 695. At step 695, the computing platform may generate and populate a second data entry interface.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
at least one processor;
a communication interface communicatively coupled to the at least one processor; and
memory storing computer-readable instructions that, when executed by the at least one processor, cause the computing platform to:
send, to an administrator computing device, one or more commands directing the administrator computing device to display a graphical user interface configured to receive user input specifying:
one or more text input fields, and
a graphical layout of the one or more text input fields;
receive, from the administrator computing device, a data object indicating the one or more text input fields and the graphical layout of the one or more text input fields;
store, using a first plurality of key value pairs, template layout information corresponding to the one or more text input fields and the graphical layout of the one or more text input fields;
identify a plurality of user accounts configured to receive an input request for the one or more text input fields;
generate, based on the template layout information, a data entry interface, wherein the data entry interface includes the one or more text input fields and is formatted based on the graphical layout of the one or more text input fields;
send, to a plurality of enterprise user devices linked to the plurality of user accounts, the data entry interface and a notification requesting user input at the one or more text input fields, wherein sending the data entry interface causes each of the plurality of enterprise user devices to cause display of the data entry interface;
receive, from each of the plurality of enterprise user devices, data entry information corresponding to responses in the one or more text input fields;
store the data entry information using a second plurality of key value pairs;
in response to receiving a request for output of an aggregate data collection based on the data entry information from one of the plurality of enterprise user devices, generate, using the second plurality of key value pairs and based on the data entry information, aggregate data collection information;
identify, based on the request to output the aggregate data collection, a first user of the one of the plurality of enterprise user devices as a market contributor;
send, to the one of the plurality of enterprise user devices, the aggregate data collection information and one or more commands directing the one of the plurality of enterprise user devices to cause display of an aggregate data collection interface, wherein sending the aggregate data collection information causes the one of the plurality of enterprise user devices to cause display of the aggregate data collection interface, and wherein the one or more commands directing the one of the plurality of enterprise user devices to cause display of the aggregate data collection interface indicate that a first version of the aggregate data collection interface, specific to market contributors, is to be displayed;
in response to receiving another request for output of the aggregate data collection based on the data entry information from another one of the plurality of enterprise user devices, generate, using the second plurality of key value pairs and based on the data entry information, the aggregate data collection information;
identify, based on the other request for output of the aggregate data collection, a second user of the other one of the plurality of enterprise user devices as a market reviewer; and
send, along with the aggregate data collection information, one or more commands directing the other one of the plurality of enterprise user devices to cause display of the aggregate data collection interface, wherein the one or more commands indicate that a second version of the aggregate data collection interface, specific to market reviewers and different from the first version of the aggregate data collection interface, is to be displayed, wherein the second version of the aggregate data collection interface includes a progress bar indicating progress of each market contributor, affiliated with a particular market reviewer, in providing data entry information.

2. The computing platform of claim 1, wherein the memory stores additional computer-readable instructions that, when executed by the at least one processor, further cause the computing platform to:
perform cross validation of the data entry information by comparing first data entry information to other received data entry information.

3. The computing platform of claim 2, wherein:
the first data entry information is received from a first enterprise user device, of the plurality of enterprise user devices, located in a first geographic location, and
the other data entry information is received from a subset of the plurality of enterprise user devices that does not include the first enterprise user device, each located in a geographic location other than the first geographic location.

4. The computing platform of claim 2, wherein the computing platform automatically performs the cross validation upon receipt of the data entry information.

5. The computing platform of claim 2, wherein the computing platform automatically performs the cross validation upon receipt of the request for the output of the aggregate data collection.

6. The computing platform of claim 1, wherein the first plurality of key value pairs comprises a plurality of correlations, each representing a relationship between one of the one or more text input fields and a location of the one of the one or more text input fields on the graphical layout of the one or more text input fields.

7. The computing platform of claim 1, wherein the second plurality of key value pairs comprises a plurality of correlations, each representing a relationship between one of the one or more text input fields and a subset of the data entry information corresponding to the one of the one or more text input fields.

8. The computing platform of claim 1, wherein receiving the data entry information comprises receiving a first subset of the data entry information from a plurality of market contributors and receiving a second subset of the data entry information from a plurality of market reviewers, and wherein the second subset of the data entry information includes a notification validating the first subset of the data entry information.

9. The computing platform of claim 1, wherein the memory stores additional computer-readable instructions that, when executed by the at least one processor, further cause the computing platform to:
identify that a predetermined period of time has expired; and
in response to identifying the expiration of the predetermined period of time, send, to the plurality of enterprise user devices linked to the plurality of user accounts, the data entry interface and a notification requesting updated user input at the one or more text input fields, wherein sending the data entry interface causes each of the plurality of enterprise user devices to cause display of the data entry interface, and wherein the data entry interface includes at least a portion of the data entry information received from the plurality of enterprise user devices prior to the expiration of the predetermined period of time.

10. The computing platform of claim 1, wherein the aggregate data collection interface comprises a slideshow.

11. A method comprising:
at a computing platform comprising at least one processor, a communication interface, and memory:
sending, to an administrator computing device, one or more commands directing the administrator computing device to display a graphical user interface configured to receive user input specifying:
one or more text input fields, and
a graphical layout of the one or more text input fields;
receiving, from the administrator computing device, a data object indicating the one or more text input fields and the graphical layout of the one or more text input fields;
storing, using a first plurality of key value pairs, template layout information corresponding to the one or more text input fields and the graphical layout of the one or more text input fields;
identifying a plurality of user accounts configured to receive an input request for the one or more text input fields;
generating, based on the template layout information, a data entry interface, wherein the data entry interface includes the one or more text input fields and is formatted based on the graphical layout of the one or more text input fields;
sending, to a plurality of enterprise user devices linked to the plurality of user accounts, the data entry interface and a notification requesting user input at the one or more text input fields, wherein sending the data entry interface causes each of the plurality of enterprise user devices to cause display of the data entry interface;
receiving, from each of the plurality of enterprise user devices, data entry information corresponding to responses in the one or more text input fields;
storing the data entry information using a second plurality of key value pairs;
in response to receiving a request for output of an aggregate data collection based on the data entry information from one of the plurality of enterprise user devices, generating, using the second plurality of key value pairs and based on the data entry information, aggregate data collection information;
identifying, based on the request to output the aggregate data collection, a first user of the one of the plurality of enterprise user devices as a market contributor;
sending, to the one of the plurality of enterprise user devices, the aggregate data collection information and one or more commands directing the one of the plurality of enterprise user devices to cause display of an aggregate data collection interface, wherein sending the aggregate data collection information causes the one of the plurality of enterprise user devices to cause display of the aggregate data collection interface, and wherein the one or more commands directing the one of the plurality of enterprise user devices to cause display of the aggregate data collection interface indicate that a first version of the aggregate data collection interface, specific to market contributors, is to be displayed;
in response to receiving another request for output of the aggregate data collection based on the data entry information from another one of the plurality of enterprise user devices, generating, using the second plurality of key value pairs and based on the data entry information, the aggregate data collection information;
identifying, based on the other request for output of the aggregate data collection, a second user of the other one of the plurality of enterprise user devices as a market reviewer; and
sending, along with the aggregate data collection information, one or more commands directing the other one of the plurality of enterprise user devices to cause display of the aggregate data collection interface, wherein the one or more commands indicate that a second version of the aggregate data collection interface, specific to market reviewers and different from the first version of the aggregate data collection interface, is to be displayed, wherein the second version of the aggregate data collection interface includes a progress bar indicating progress of each market contributor, affiliated with a particular market reviewer, in providing data entry information.

12. The method of claim 11, further comprising:
performing cross validation of the data entry information by comparing first data entry information to other received data entry information.

13. The method of claim 12, wherein:
the first data entry information is received from a first enterprise user device, of the plurality of enterprise user devices, located in a first geographic location, and
the other data entry information is received from a subset of the plurality of enterprise user devices that does not include the first enterprise user device, each located in a geographic location other than the first geographic location.

14. The method of claim 12, wherein the computing platform automatically performs the cross validation upon receipt of the data entry information.

15. The method of claim 12, wherein the computing platform automatically performs the cross validation upon receipt of the request for the output of the aggregate data collection.

16. The method of claim 11, wherein the first plurality of key value pairs comprises a plurality of correlations, each representing a relationship between one of the one or more text input fields and a location of the one of the one or more text input fields on the graphical layout of the one or more text input fields.

17. The method of claim 11, wherein the second plurality of key value pairs comprises a plurality of correlations, each representing a relationship between one of the one or more text input fields and a subset of the data entry information corresponding to the one of the one or more text input fields.

18. The method of claim 11, wherein receiving the data entry information comprises receiving a first subset of the data entry information from a plurality of market contributors and receiving a second subset of the data entry information from a plurality of market reviewers, and wherein the second subset of the data entry information includes a notification validating the first subset of the data entry information.

19. The method of claim 11, wherein the aggregate data collection interface comprises a slideshow.

20. One or more non-transitory computer-readable media storing instructions that, when executed by a computing platform comprising at least one processor, a communication interface, and memory, cause the computing platform to:
send, to an administrator computing device, one or more commands directing the administrator computing device to display a graphical user interface configured to receive user input specifying:
one or more text input fields, and
a graphical layout of the one or more text input fields;
receive, from the administrator computing device, a data object indicating the one or more text input fields and the graphical layout of the one or more text input fields;
store, using a first plurality of key value pairs, template layout information corresponding to the one or more text input fields and the graphical layout of the one or more text input fields;
identify a plurality of user accounts configured to receive an input request for the one or more text input fields;
generate, based on the template layout information, a data entry interface, wherein the data entry interface includes the one or more text input fields and is formatted based on the graphical layout of the one or more text input fields;
send, to a plurality of enterprise user devices linked to the plurality of user accounts, the data entry interface and a notification requesting user input at the one or more text input fields, wherein sending the data entry interface causes each of the plurality of enterprise user devices to cause display of the data entry interface;
receive, from each of the plurality of enterprise user devices, data entry information corresponding to responses in the one or more text input fields;
store the data entry information using a second plurality of key value pairs;
in response to receiving a request for output of an aggregate data collection based on the data entry information from one of the plurality of enterprise user devices, generate, using the second plurality of key value pairs and based on the data entry information, aggregate data collection information;
identify, based on the request to output the aggregate data collection, a first user of the one of the plurality of enterprise user devices as a market contributor;
send, to the one of the plurality of enterprise user devices, the aggregate data collection information and one or more commands directing the one of the plurality of enterprise user devices to cause display of an aggregate data collection interface, wherein sending the aggregate data collection information causes the one of the plurality of enterprise user devices to cause display of the aggregate data collection interface, and wherein the one or more commands directing the one of the plurality of enterprise user devices to cause display of the aggregate data collection interface indicate that a first version of the aggregate data collection interface, specific to market contributors, is to be displayed;
in response to receiving another request for output of the aggregate data collection based on the data entry information from another one of the plurality of enterprise user devices, generate, using the second plurality of key value pairs and based on the data entry information, the aggregate data collection information;
identify, based on the other request for output of the aggregate data collection, a second user of the other one of the plurality of enterprise user devices as a market reviewer; and
send, along with the aggregate data collection information, one or more commands directing the other one of the plurality of enterprise user devices to cause display of the aggregate data collection interface, wherein the one or more commands indicate that a second version of the aggregate data collection interface, specific to market reviewers and different from the first version of the aggregate data collection interface, is to be displayed, wherein the second version of the aggregate data collection interface includes a progress bar indicating progress of each market contributor, affiliated with a particular market reviewer, in providing data entry information.

* * * * *